US010237764B2

(12) United States Patent
Minezawa et al.

(10) Patent No.: US 10,237,764 B2
(45) Date of Patent: Mar. 19, 2019

(54) ASSISTANCE DEVICE, ASSISTANCE METHOD AND PROGRAM

(75) Inventors: Satoshi Minezawa, Tokyo (JP); Yoshiaki Koizumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 170 days.

(21) Appl. No.: 14/406,881

(22) PCT Filed: Jun. 26, 2012

(86) PCT No.: PCT/JP2012/066259
§ 371 (c)(1),
(2), (4) Date: Dec. 10, 2014

(87) PCT Pub. No.: WO2014/002186
PCT Pub. Date: Jan. 3, 2014

(65) Prior Publication Data
US 2015/0138990 A1 May 21, 2015

(51) Int. Cl.
*H04W 24/06* (2009.01)
*H04B 17/15* (2015.01)
*H04B 17/29* (2015.01)

(52) U.S. Cl.
CPC ............ *H04W 24/06* (2013.01); *H04B 17/15* (2015.01); *H04B 17/29* (2015.01)

(58) Field of Classification Search
CPC .................................................... H04W 4/00
See application file for complete search history.

(56) References Cited

U.S. PATENT DOCUMENTS 5,357,557 A * 10/1994 Sakakura ............... H04W 24/00
379/27.06
8,521,092 B2 8/2013 Kennedy et al.
(Continued)

FOREIGN PATENT DOCUMENTS

JP    H05-130009 A    5/1993
JP    2002-58056 A    2/2002
(Continued)

OTHER PUBLICATIONS

International Search Report of the International Searching Authority dated Aug. 7, 2012 for the corresponding international application No. PCT/JP2012/066259 (and English translation).
(Continued)

*Primary Examiner* — Chi H Pham
*Assistant Examiner* — Raul Rivas
(74) *Attorney, Agent, or Firm* — Posz Law Group, PLC

(57) ABSTRACT

An assistance device is provided with: a communication setting information generator which, from among a plurality of wireless terminals, extracts a first predetermined number of transmission-use wireless terminals to be tested, and a second predetermined number of receiving-use wireless terminals that are different from the transmission-use wireless terminals, which are treated together as one set, and while varying combinations thereof, specifies a predetermined number of sets; and a communication setting information generator which, for each of the specified predetermined number of sets, generates an execution plan of tests for performing a test of causing a transmission-use wireless terminal to transmit information and causing a receiving-use wireless terminal to receive the information transmitted by the transmission-use wireless terminal, and sequentially executing tests for all of the predetermined number of sets.

12 Claims, 15 Drawing Sheets

(56) References Cited

U.S. PATENT DOCUMENTS

| | | | |
|---|---|---|---|
| 2004/0030756 A1 | | 2/2004 | Matsuyama et al. |
| 2006/0174162 A1 | | 8/2006 | Varadarajan et al. |
| 2007/0014341 A1 | | 1/2007 | Rowse et al. |
| 2007/0052435 A1 | | 3/2007 | Bielas et al. |
| 2008/0026781 A1 | * | 1/2008 | Ho .......................... H02J 9/02 455/507 |

FOREIGN PATENT DOCUMENTS

| | | | | |
|---|---|---|---|---|
| JP | 2003-224534 | A | | 8/2003 |
| JP | 2005-210333 | A | | 8/2005 |
| JP | 2007-027953 | A | | 2/2007 |
| JP | 2008-306603 | A | | 12/2008 |
| JP | 2008306603 | A | * | 12/2008 |
| JP | 2009-260754 | A | | 11/2009 |
| JP | 2009260754 | A | * | 11/2009 |

OTHER PUBLICATIONS

Office Action dated, Aug. 25, 2015 in corresponding JP patent application No. 2014-522268 (with English Translation).
Office Action dated Feb. 1, 2018 issued in corresponding GB patent application No. 1422374.7.
Office Action dated Apr. 23, 2018 issued in corresponding DE patent application No. 112012006601.4 (and English translation thereof).
Office Action dated Jan. 10, 2019 issued in corresponding GB patent application No. GB1422374.7.

* cited by examiner

FIG.3

| | NUMBER OF WIRELESS TERMINALS | NUMBER OF COMMUNICATION PATHS | NUMBER OF COMMUNICATION PATH SETS | AVERAGE TRAFFIC VOLUME | TRANSMISSION FORM | RECEPTION CHANNEL | MODULATION FORMAT |
|---|---|---|---|---|---|---|---|
| INPUT VALUE | 5 | 5 | — | 20% | PERIODIC | FF FF: 7 (FIRST WIRELESS TERMINAL) AB CD : 3 (SECOND WIRELESS TERMINAL) ⋯ BB CC : 1 (FIFTH WIRELESS TERMINAL) | QAM |
| NUMBER OF VARIATIONS | NONE | NONE | 2 | 3 | — | | |

FIG.4A

| NAME OF PREPARATORY INFORMATION | NUMBER OF WIRELESS TERMINALS | NUMBER OF COMMUNICATION PATHS | NAME OF COMMUNICATION PATH SET | AVERAGE TRAFFIC VOLUME |
|---|---|---|---|---|
| FIRST | 5 | 5 | FIRST | 15% |
| SECOND | 5 | 5 | FIRST | 20% |
| THIRD | 5 | 5 | FIRST | 25% |
| FOURTH | 5 | 5 | SECOND | 15% |
| FIFTH | 5 | 5 | SECOND | 20% |
| SIXTH | 5 | 5 | SECOND | 25% |

ASSISTANCE DEVICE, ASSISTANCE METHOD AND PROGRAM

CROSS REFERENCE TO RELATED APPLICATION

This application is a U.S. national stage application of International Patent Application No. PCT/JP2012/066259 filed on Jun. 26, 2012.

TECHNICAL FIELD

The present disclosure relates to an assistance device, assistance method and program.

BACKGROUND

The load test performance evaluation system disclosed in Patent Literature 1 is a system that can conduct tests without communication devices being operated by a worker, by causing communication devices to automatically conduct tests of sending and receiving information.

The load test performance evaluation system disclosed in Patent Literature 1 conducts a test on a node B device 1 by causing a load tester 2 capable of sending data to send a large volume of user data (information) to the node B device 1 that is to be tested in accordance with a predetermined sequence, through automatic control of an automatic test device 5. Through this, the actions of the load tester 2 are automatically controlled by the automatic test device 5, so the load test performance evaluation system can conduct tests without the load tester 2 being operated by a worker.

PATENT LITERATURE

Patent Literature 1: Unexamined Japanese Patent Application Kokai Publication No. 2005-210333

Technical Problem

The load test performance evaluation system disclosed in Patent Literature 1 is such that the communication device (load test device 2) that sends information and the communication device (node B device 1) that receives information are fixed, so it is not possible to change sending and receiving combinations to conduct tests.

Consequently, in order to conduct a load test conforming to operation when the sending and receiving combination has been appropriately changed, the user must conduct the load test by creating an execution plan for tests, and specifying and designating the combination of the transmission-use communication device and the receiving-use communication device and in what sequence to cause the communications devices to undertake the series of communications from sending to receiving the information.

The same problem arises when conducting tests accompanying sending and receiving information by selecting a transmission-use communication device and a receiving-use communication device.

SUMMARY

In consideration of the foregoing, it is an objective of the present disclosure to provide an assistance device, assistance method and program for assisting in creation of an execution plan for tests of communication devices.

In order to achieve the aforementioned object, the designator of the assistance device according to the present disclosure extracts as one set a plurality of transmission-use communication devices to be tested and a plurality of receiving-use communication devices that differ from the transmission-use communication devices, out of a plurality of communication devices, and designates the for-receiving communication devices and the transmission-use communication devices by combination of one device among the extracted plurality of transmission-use communication devices and one device among the extracted plurality of for-receiving communication devices. The plan generator generates a test execution plan for executing tests of causing information to be sent by the transmission-use communication devices and causing the information sent by the transmission-use communication devices to be received by the receiving-use communication devices, for a plurality of sets designated by the designator, and executes successive tests.

With the present disclosure, it is possible to assist in creation of an execution plan for tests of communication devices.

BRIEF DESCRIPTION OF DRAWINGS

FIG. 3 is a drawing showing contents of setting information;

FIG. 4A is a drawing showing contents of preparatory information.

DETAILED DESCRIPTION

Figure 1:
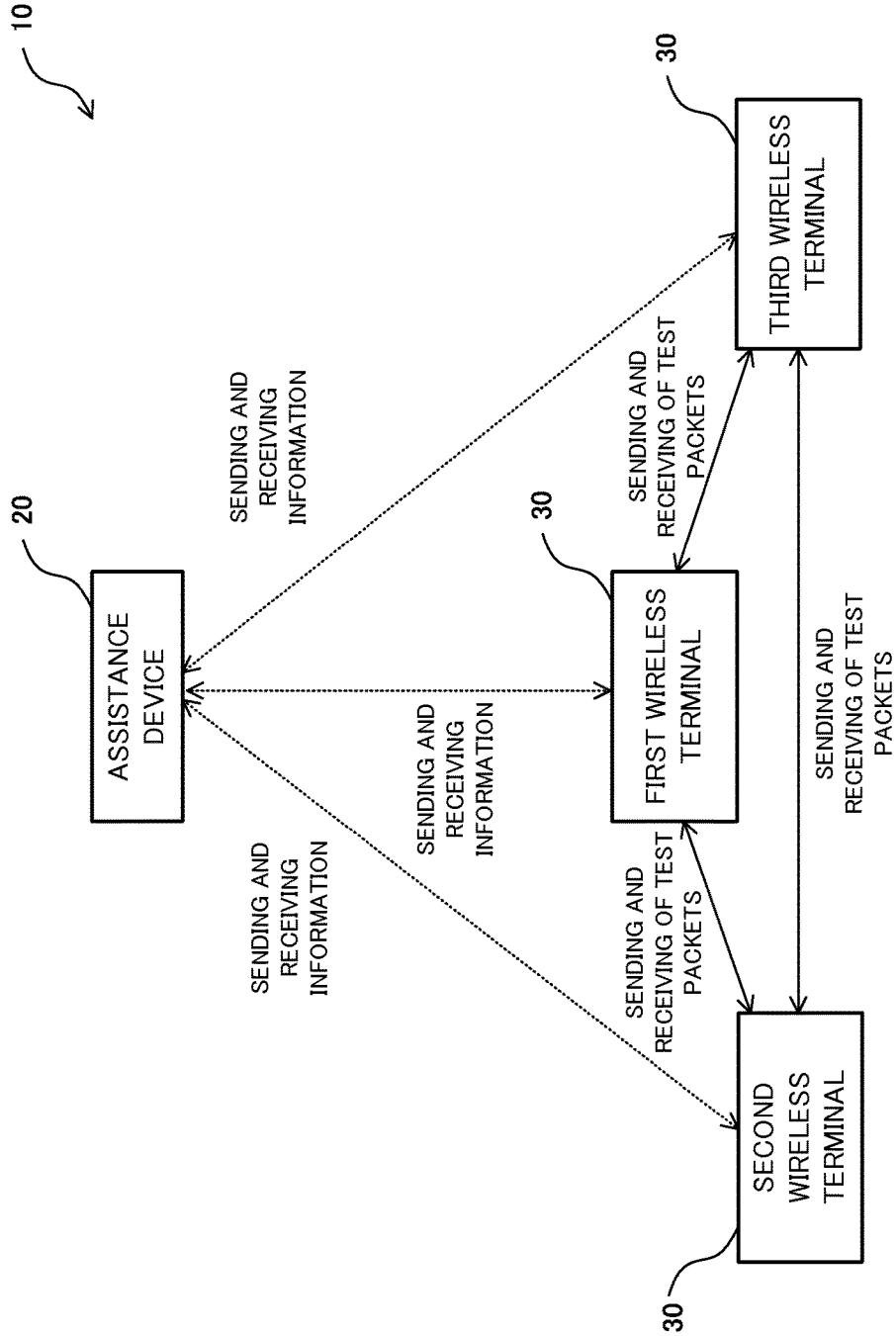
FIG. 1 is a drawing schematically showing a communication system according to the exemplary embodiment of the present disclosure.

Below, a communication system 10 according to the exemplary embodiments of the present disclosure are described with reference to FIGS. 1 through 13. As shown in FIG. 1, the communication system 10 comprises an assistance device 20 and first through third wireless terminals 30.

The assistance device 20 accomplishes wireless communication with the first through third wireless terminals 30. The assistance device 20 accomplishes sending of various information to the wireless terminals 30. The assistance device 20 controls the wireless terminals 30 through various information sent to the wireless terminals 30. In addition, the assistance device 20 receives data sent from the wireless terminals 30.

The first through third wireless terminals 30 are communication devices for accomplishing wireless communication with the assistance device 20. In addition, the first through third wireless terminals 30 accomplish sending and receiving of packets for test communication (hereafter abbreviated as "test packets"), or in other words accomplish test communication, among the wireless terminals 30 in accordance with contents indicated by the various information sent from the assistance device 20. This test communication is a test of changing the wireless terminal 30 sending the test packets and the wireless terminal 30 receiving the test packets. In this manner, the assistance device 20 causes sending and receiving of test packets (test communication) to be conducted in a prescribed sequence by the wireless terminals 30 by causing the wireless terminal sending the test packets and the wireless terminal 30 receiving the test packets to change, through various information sent. Through this, with the assistance device 20 it is possible to assist in creation of an execution plan for test communication to determine in what sequence the series of communications from sending to receiving test packets should be caused to be executed by the wireless terminals 30.

When the test communication concludes, the first through third wireless terminals 30 store the results of the test packet sending and receiving (measurement data). In addition, the first through third wireless terminals 30 send the stored measurement data to the assistance device 20 in accordance with sending commands sent from the assistance device 20. Through this, the assistance device 20 acquires various measurement data from the first through third wireless terminals 30. Hence, it is possible for a user to accomplish analysis of the test communications accomplished among the first through third wireless terminals 30 by analyzing the various measurement data acquired by the control apparatus 20. With the above-described communication system 1, the three first through third wireless terminals 30 are used, but the wireless terminals 30 used are not limited to this, and it would be fine if the number of terminals were 2 or 5.

Figure 2:
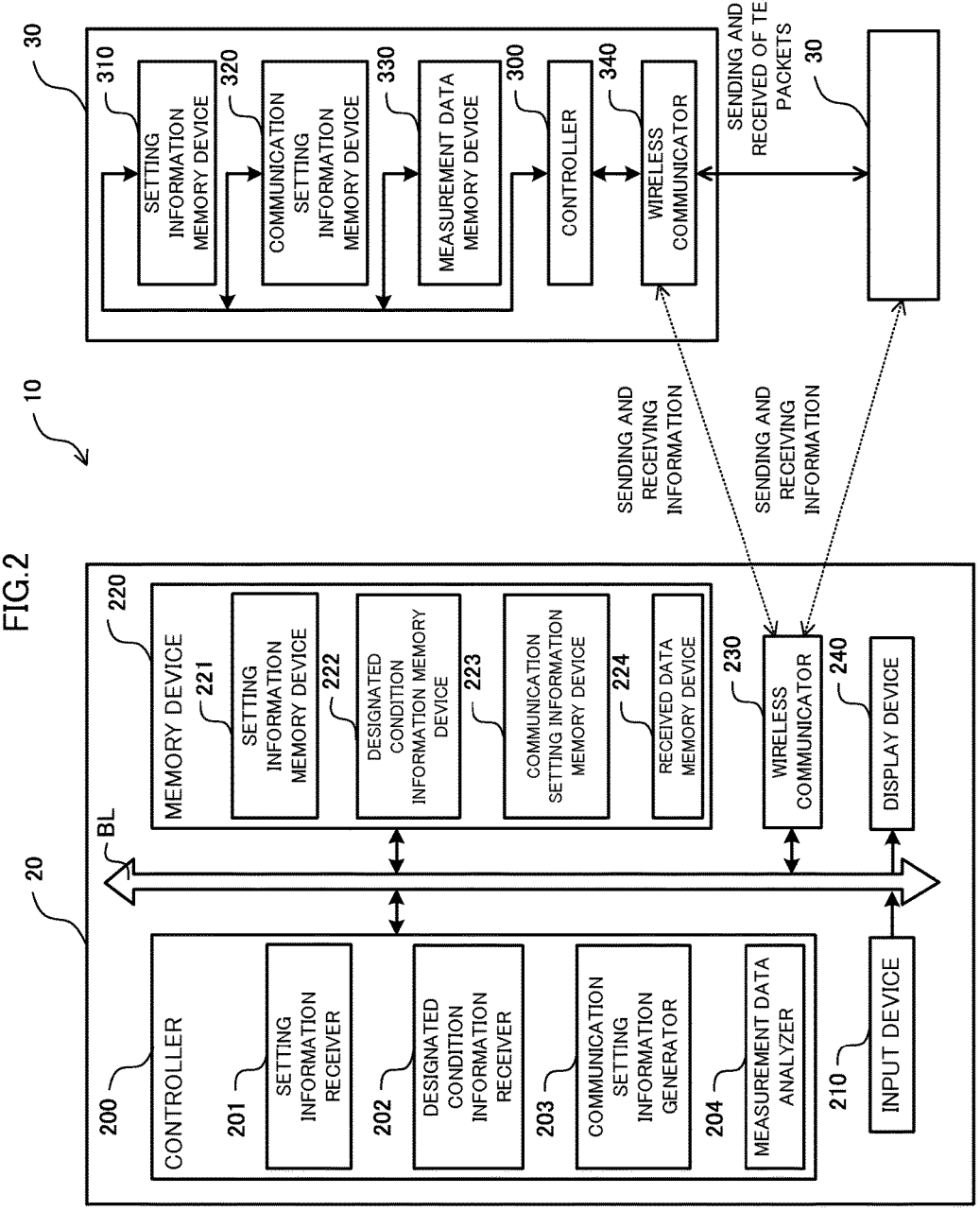
FIG. 2 is a block diagram of an assistance device and a wireless terminal.

A block diagram of the communication system 10 comprising the above-described assistance device 20 and the wireless terminals 30 is as shown in FIG. 2.

The assistance device 20 comprises a personal computer, for example. The assistance device 20 comprises a controller 200, an input device 210, a memory device 220, a wireless communicator 230, a display device 240 and a bus line BL.

The controller 200 accomplishes control of the assistance device 20. The controller 200 comprises an unrepresented CPU (Central Processing Unit), ROM (Read Only Memory) and RAM (Random Access Memory).

The CPU executes programs (for example, programs realizing processes shown in below-described FIGS. 6-10) stored in the ROM.

In addition, by the CPU executing programs stored in the ROM, the controller 200 comprises a setting information receiver 201, a designated condition information receiver 202, a communication setting information generator 203 and a measurement data analyzer 204.

The setting information receiver 201 receives from the user input of setting information for enabling communication among the wireless terminals 30. Specifically, the setting information receiver 201 receives input of setting information as follows. That is to say, the setting information receiver 201 first displays on the display device 240 a setting screen that causes a user to set the setting information. Here, the setting information set by the user is specifically information associated with MAC (Media Access Control) addresses of the wireless terminals 30, assigned addresses assigned to the wireless terminals 30 (address showing the wireless terminals 30 capable of sending and receiving test packets), reception channels of the wireless terminals 30 for receiving the test packets sent and a modulation format (protocol) for test packets sent by the wireless terminals 30. When setting information is input by the user through operation of the input device 210, the setting information receiver 201 stores the input setting information in a setting information memory device 221.

The controller 200 sends the setting information stored in the setting information memory device 221 to the wireless terminals 30. Through this, the wireless terminals 30 become able to send and receive test packets. In addition, in this embodiment, the test packet modulation method is the same method as in the wireless terminals (for example, the QAM (Quadrature Amplitude Modulation) method).

The designated condition information receiver 202 receives from the user input of conditions for test communications the wireless terminals 30 are caused to execute. Specifically, the designated condition information receiver 202 receives input of test communication conditions as follows. That is to say, the designated condition information receiver 202 first displays on the display device 240 a designation screen that causes test communication conditions to be designated. Here, there are five conditions designated by the user as shown in FIG. 3, namely the number of wireless terminals 30, the number of communication paths, the number of communication path sets, the average traffic volume and the transmission form.

The number of wireless terminals 30 indicates the number of wireless terminals 30 used in test communications, specifically the number of wireless terminals 30 that are targets of causing test packets to be sent and received. In addition, the number of communication paths indicates how many communication paths for sending and receiving the test packets there are, with a path connecting a wireless terminal 30 that is a transmitter of the test packet and a wireless terminal 30 that is a recipient of the test packet as a single communication path. In addition, the number of communication path sets indicates how many communication path sets there are, with communications paths comprising communication paths in a number indicated by the number of communication paths as one set. The average traffic volume is the average value of the information volume of information (test packets) communicated by the communication path sets. And, the transmission form indicates whether test packets sent from the wireless terminals 30 are transmitted with a periodic timing or are transmitted with a random timing. Periodic timing indicates for example that a test packet is transmitted from the first wireless terminal 30 and after 0.05 mS has elapsed, the test packet is transmitted from the second wireless terminal 30, and after 0.05 mS has elapsed, the test packet is transmitted from the third wireless terminal 30.

Of the above-described five conditions, the number of wireless terminals 30, the number of communication paths and the average traffic volume can be designated by the two variables of the input value and the number of variations. For example, as shown in FIG. 3, when the user has designated that the input value of the number of wireless terminals 30 is "5" and the number of variations is "none," the communication setting information generator 203 generates communication setting information indicating the contents of the test communications, using only one variation of the "5" that is the number of the wireless terminals 30. On the other hand, when the user has designated that the input value of the number of wireless terminals 30 is "5" and the number of variations is "3," the communication setting information generator 203 generates communication setting information with the number of wireless terminals 30 a number indicated by the three variations "4", "5" and "6", centered on the input value "5".

Similarly, when the user has designated that the input value of the average traffic volume is 20% and the number of variations is "none," the communication setting information generator 203 generates communication setting information with only the one variation of "20%" for the input value of the average traffic value. On the other hand, when the input value of the average traffic volume is "20%" and the user has designated that the number of variations is "3," the communication setting information generator 203 generates communication setting information with the average traffic volume a number indicated by three variations of for example "15%", "20%" and "25%", centered on the input value of "20%." When the average traffic volume is designated at "100%", the communication setting information generator 203 generates communication setting information with contents of the wireless terminals 30 transmitting test packets with the maximum traffic volume that can be transmitted within a prescribed period. As described above, because the average traffic volume can be set, when there are few wireless terminals 30 that can be used in test communication, the user can cause the communication setting information generator 203 to generate communication setting information indicating a state as though a large number of wireless terminals 30 are present, by increasing the average traffic volume.

An input value cannot be designated for the number of communication path sets, as it is possible to designate only the number of variations. For example, as shown in FIG. 3, when the user designates that the input value of the number of communication path sets is "2", the communication setting information generator 203 generates communication setting information with "2" as the number of communication path sets.

In addition, a number of variations of the transmission form cannot be designated, as it is possible to designate only an input value. For example, as shown in FIG. 3, when the user has designated that the input value of the transmission form is "periodic," the communication setting information generator 203 generates communication setting information with content that causes test packets to be sent periodically to the wireless terminals 30.

When the above-described five conditions (the number of wireless terminals 30, the number of communication paths, the number of communication path sets, the average traffic volume and the transmission form) are designated by the user, the designated condition information receiver 202 associates with the designated five conditions information associating information indicating reception channel stored in the setting information memory device 221 (information associating reception channel and assigned address) and modulation method, and modulation method, and stores the associated information (see FIG. 3) in a designated condition information memory device 222. Below, the information stored in the designated condition information memory device 222 is called designated condition information.

As described above, the communication setting information generator 203 generates preparatory information needed for generating communication setting information indicating the contents of test communications based on the designated condition information (see FIG. 3) stored in the designated condition information memory device 222.

Specifically, the communication setting information generator 203 generates preparatory information as follows. That is to say, the communication setting information generator 203 computes the number of patterns indicating for which it is necessary to accomplish what pattern of test communication, by acquiring the designated condition information stored in the designated condition information memory device 222 and multiplying the number of variations contained in the designated condition information. For example, when the designated condition information shown in FIG. 3 is stored in the designated condition information memory device 222, the communication setting information generator 203 computes the number of patterns to be "6" because the number of variations is "2 (corresponding to the number of communication path sets)" and "3 (corresponding to the average traffic volume)". As shown in FIG. 4A, these six patterns are the three patterns (patterns corresponding to the first through third preparatory information) with the average traffic volume of the first of the communication path sets at "15%", "20%" and "25%", and the three patterns (patterns corresponding to the fourth through sixth preparatory information) with the average traffic volume of the second of the communication path sets at "15%", "20%" and "25%". The communication setting information generator 203 generates preparatory information by associating the number of communication paths and the number of wireless terminals 30 included in the acquired designated condition information to each of the computed patterns. For example, when the designated condition information shown in FIG. 3 is stored in the designated condition information memory device 222, the communication setting information generator 203 associates the number "5" of communication paths and wireless terminals 30 included in the acquired designated condition information to the information of each pattern, as shown in FIG. 4A. In this manner, the communication setting information generator 203 generates preparatory information for example as shown in FIG. 4A. Furthermore, the communication setting information generator 203 stores the generated preparatory information in the RAM (unrepresented).

When the preparatory information is stored in the RAM, the communication setting information generator 203 generates communication setting information indicating contents of test communications to be executed by the wireless terminals 30.

Specifically, the communication setting information generator 203 generates communication setting information as follows. That is to say, the communication setting information generator 203 for example extracts from the setting information memory device 221 the number of assigned addresses corresponding to the number of wireless terminals 30 (the number of wireless terminals 30 included in the preparatory information stored in the RAM) designated by the user, and sets the extracted assigned addresses as candidates (terminal candidates) for wireless terminals to send and receive test packets.

Following this, the communication setting information generator 203 selects (extracts) one assigned address from the assigned addresses extracted as terminal candidates, following a random number table (a random number table associating the assigned addresses extracted as terminal candidates with random number values output from a random number generator housed in the controller 200). Following this, the communication setting information generator 203 deletes the selected assigned address from the assigned addresses extracted as terminal candidates, and selects (extracts) one assigned address from the post-deletion assigned addresses, following a random number table (a random number table associating the post-deletion assigned addresses and a random number value output from a random number generator housed in the controller 200). Following this, the communication setting information generator 203 for example decides on the assigned address selected first as the transmission-use assigned address, and decides on the assigned address selected after as the receiving-use assigned address. Furthermore, the communication setting information generator 203 determines whether the assigned address set in which the selected transmission-use assigned address and the selected receiving-use assigned address form one set has not already been selected (whether the same assigned address set is already retained). When the communication setting information generator 203 determines that the same assigned address set is already selected, the assigned address set selected this time is deleted and the transmission-use assigned address and the receiving-use assigned address are selected again. On the other hand, when the communication setting information generator 203 determines that the assigned address set is unselected, the assigned address set is retained (stored) in the RAM (unrepresented). When the preparatory information shown in FIG. 4A is stored in the RAM, for example, the communication setting information generator 203 accomplishes retention (storing) of the transmission-use assigned address and the receiving-use assigned address "5" times, which is the number of communication paths designated by the user, and retains (store) five assigned address sets in the RAM.

That is, the communication setting information generator 203 extracts as one set, from among the multiple communication devices, a first predetermined number of transmission-use communication devices that are the target of test communication and a second predetermined number of receiving-use communication devices that are different from the transmission-use communication devices, and specifies a predetermined number of assigned address sets while causing the combinations to change. The communication setting information generator 203 at times is called a specifier. The communication setting information generator 203 may, for example, decide on the assigned address selected first as the receiving-use assigned address and the assigned address selected later as the transmission-use assigned address. In addition, when the assigned addresses of terminal candidates are extracted by the communication setting information generator 203, the above-described random number table may be generated by the controller 200.

When the same number of address sets as designated communication paths are stored in the RAM, the communication setting information generator 203 decides on the transmission timing for sending test packets in the order in which the assigned addresses are stored in the RAM (in order of the earliest stored).

Figure 4B:
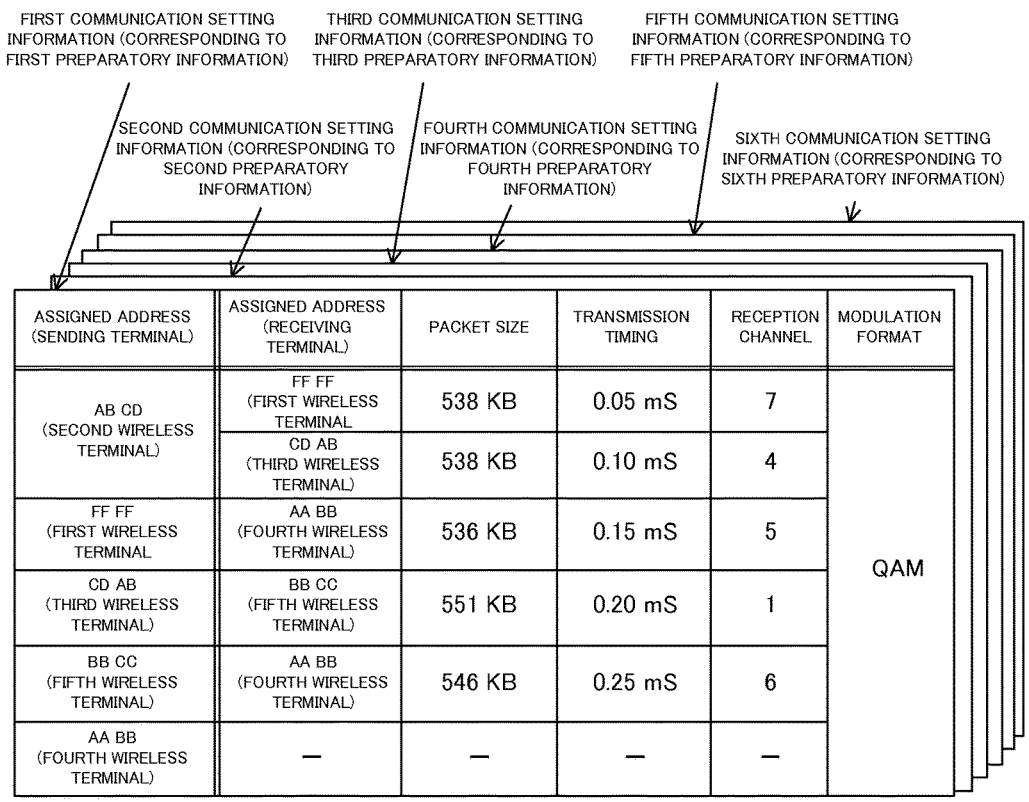
FIG. 4B is a drawing showing contents of communication setting information.

Specifically, when for example the assigned address set consisting of the assigned address corresponding to the second wireless terminal 30 (the transmission-use assigned address) and the assigned address corresponding to the first wireless terminal 30 (the receiving-use assigned address) is stored first in the RAM and the designated conditions shown in FIG. 3 are stored in the designated condition information memory device 222, the communication setting information generator 203 sets the sending terminal for the test packet to the wireless terminal 30 indicated by the assigned address "AB CD" corresponding to the second wireless terminal 30, as shown in FIG. 4B.

Next, the communication setting information generator 203 acquires the transmission form stored in the designated information memory device 222 (see FIG. 3). Then, the communication setting information generator 203 decides the transmission timing with which the wireless terminal 30 indicated by the transmission-use assigned address in the assigned address set sends the test packets to be "0.05 mS", as shown in FIG. 4B, from the acquired transmission form and the fact that the order in which the assigned address set is stored in the RAM is first. The timing of sending the test packets indicates the elapsed time from reception of the test start command commanding the start of the test, sent from the assistance device 20.

Then, the communication setting information generator 203 sets the receiving terminal for the test packet to be the wireless terminal 30 indicated by the assigned address "FF FF" corresponding to the first wireless terminal 30, as shown in FIG. 4B.

In addition, when for example the assigned address set consisting of the assigned address corresponding to the first wireless terminal 30 (the transmission-use assigned address) and the assigned address corresponding to the fourth wireless terminal 30 (the receiving-use assigned address) is stored third in the RAM and the designated conditions shown in FIG. 3 are stored in the designated condition information memory device 222, the communication setting information generator 203 sets the sending terminal for test packets to be the wireless terminal 30 indicated by the assigned address "FF FF" corresponding to the first wireless terminal 30, as shown in FIG. 4B.

Next, the communication setting information generator 203 acquires the transmission form stored in the designated information memory device 222 (see FIG. 3). Then, the communication setting information generator 203 decides the transmission timing with which the wireless terminal 30 indicated by the transmission-use assigned address in the assigned address set sends the test packets to be "0.15 mS", as shown in FIG. 4B, from the acquired transmission form and the fact that the order in which the assigned address set is stored in the RAM is third.

Furthermore, the communication setting information generator 203 sets the test packet receiving terminal as the wireless terminal 30 indicated by the assigned address "AA BB" corresponding to the fourth wireless terminal 30, as shown in FIG. 4B.

In this manner, the communication setting information generator 203 causes the series of communications from sending of the test packet by the wireless terminal 30 indicated by the transmission-use assigned address to receiving of the test packet to be conducted in accordance with the order in which the assigned address sets are stored (the order generated).

In addition, the communication setting information generator 203 acquires the average traffic volume designated by the user, that is to say the average traffic volume included in the preparatory information stored in the RAM, in order to decide the packet size of test packets. In addition, the communication setting information generator 203 acquires the number of communication paths designated by the user, that is to say the number of communication paths included in the preparatory information stored in the RAM.

Then, the communication setting information generator 203 computes the average traffic volume per communication path by dividing the average traffic volume acquired by the number of communication paths acquired. For example, when the average traffic volume designated by the user is "15%" and the number of communication paths designated by the user is "5", the communication setting information generator 203 calculates 3% as the average traffic volume per communication path.

Furthermore, the communication setting information generator 203 decides on the information volume (packet size) corresponding to the average traffic volume per communication path, from the computed average traffic volume per communication path and the maximum information volume that can be sent when the average traffic volume is 100%. The communication setting information generator 203 associates the determined packet size with the communication path (with the assigned address set in which the transmission-use assigned address and the receiving-use assigned address are a single set) and stores the result in the RAM.

For example, when the average traffic volume designated by the user is "15%" and the number of communication paths designated by the user is "5" (see the first communication setting information in FIG. 4A), the communication setting information generator 203 computes the average traffic volume per communication path to be "3%" and determines the information volume (packet size) corresponding to the computed average traffic volume to be, for example 536 kB or 538 kB (see FIG. 4B).

In addition, the communication setting information generator 203 acquires the reception channel corresponding to the assigned address matching the receiving-use assigned address, from among the information (see FIG. 3) indicating the reception channel stored in the designated condition information memory device 222. Furthermore, the communication setting information generator 203 sets the channel matching the acquired reception channel for receiving as the sending frequency of the test packets (see FIG. 4B).

Finally, the communication setting information generator 203 acquires the modulation method stored in the designated information memory device 222. Then, the communication setting information generator 203 sets the acquired modulation format as the modulation format of the test packets (see FIG. 4B).

In this manner, the communication setting information generator 203 generates the number of computed patterns and the communication setting information. Furthermore, the communication setting information generator 203 stores the generated communication setting information in a communication setting information memory device 223.

Each time test communication is accomplished, the controller 200 immediately prior to the test communication sends to the wireless terminals 30 one of the items of communication setting information stored in the communication setting information memory device 223 in order from the first communication setting information item. Specifically, when the wireless terminals 30 are caused to execute the initial test communication, the controller 200 sends the first communication setting information item to the wireless terminals 30. Then, after the initial test communication concludes, when the wireless terminals 30 are caused to execute the second test communication, the controller 200 sends the second communication setting information item to the wireless terminals 30.

When the one item of communication setting information that was sent is received, the wireless terminals 30 store the one item of communication setting information received. Following this, when a test start command is received from the assistance device 20, the wireless terminals 30 send test packets in accordance with content indicated by the stored communication setting information.

For example, when the first item of communication setting information shown in FIG. 4B is stored in the wireless terminals 30, the first wireless terminal 30 sends a test packet having a packet size of 536 kB to the fourth wireless terminal 30 indicated by the transmission address "AA BB" with the sending frequency indicated by the reception channel 7 after 0.15 mS has elapsed after receipt of the test start command.

Figure 5A:
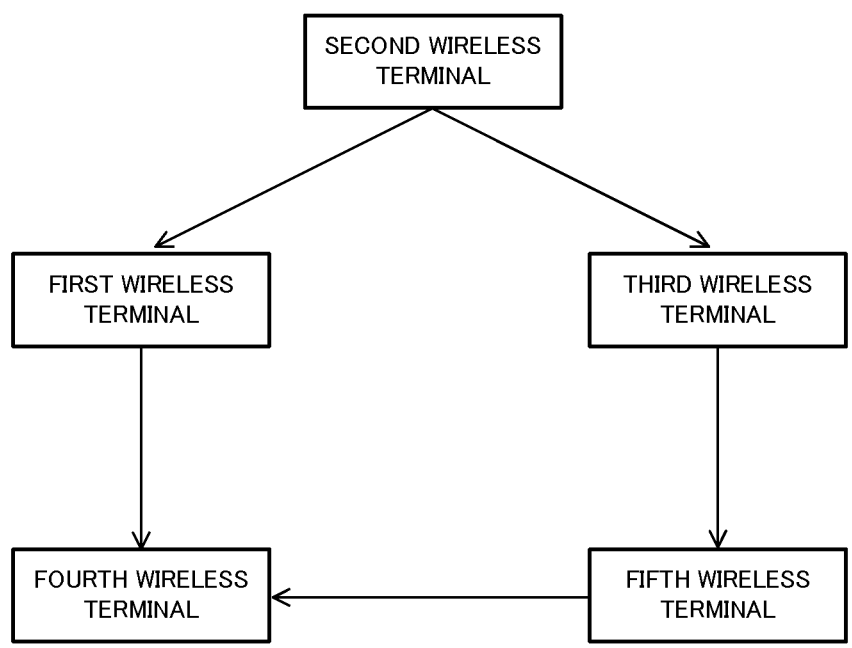
FIG. 5A and FIG. 5B are drawings showing examples of communication path sets.
Figure 5B:
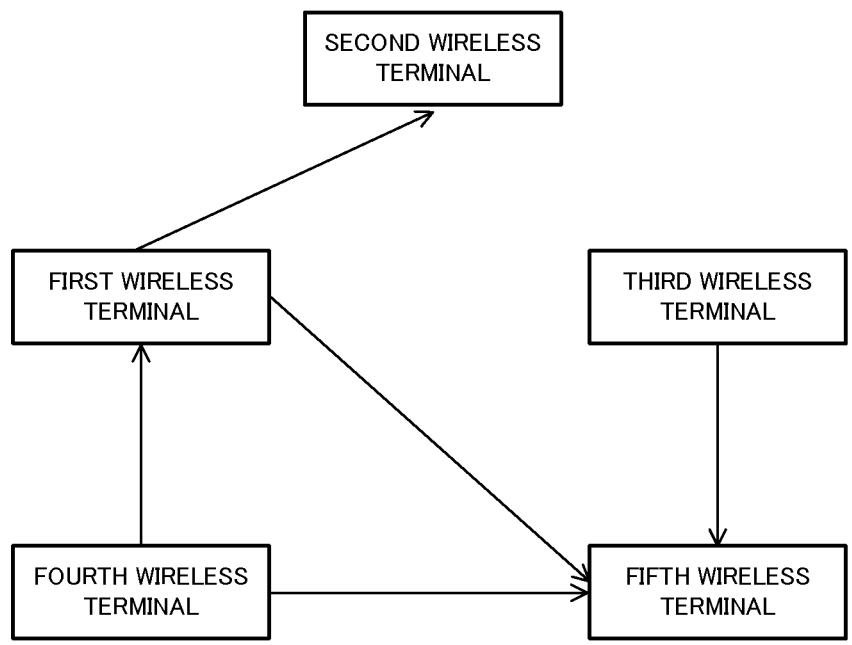

Examples of communication path sets formed when test packets are caused to be sent in accordance with contents indicated by items of communication setting information are shown in FIGS. 5A and 5B. The communication path set shown in FIG. 5A for example corresponds to the first of the communication path sets (see FIGS. 4A, 4B), and the communication path set shown in FIG. 5B for example corresponds to the second of the communication path sets (see FIG. 4A). In this manner, by the wireless terminals 30 sending test packets in accordance with content indicated by the communication setting information, the assistance device 20 can cause the wireless terminals 30 to form the communication path sets shown in FIGS. 5A and 5B.

In this manner, the communication setting information generator 203 for each of the items of communication setting information, in other words for each of the assigned address sets, executes a test in which test packets are caused to be sent to the wireless terminal 30 indicated by the transmission-use assigned address and the test packets sent by the wireless terminal 30 indicated by the transmission-use assigned address are caused to be received by the wireless terminal 30 indicated by the receiving-use assigned address, and generates a test execution plan for successively executing tests for all of the assigned address sets. The communication setting information generator 203 is also called a plan generator.

When the wireless terminals 30 send the test packets, measurement data associating the assigned address indicating the destination (receiving terminal) of the test packets and the transmission time (present time clocked by clocks possessed by the wireless terminals 30) is stored. In addition, when the wireless terminals 30 receive test packets, measurement data associating the number of times test packets are received and the reception time (current time measured by a clock) are stored at each transmitter (sending terminal) of the test packets. Furthermore, when sending commands sent from the assistance device are received, the wireless terminals 30 send the stored measurement data to the assistance device 20.

The controller 200 receives the measurement data sent from the wireless terminals 30 and stores the measurement data in a received data memory device 224.

The measurement data analyzer 204 analyzes the measurement data stored in the received data memory device 224 and displays an analysis screen showing a PER (Packet Error Rate), throughput and/or the like on the display device 240.

The input device 210 is, for example, a keyboard. The input device 210 is used, for example, to input setting information or to input designation of conditions for test communications.

The memory device 220 is, for example, flash memory. The memory device 220 comprises the setting information memory device 221, the designated condition information memory device 222, the communication setting information memory device 223 and the received data memory device 224.

The setting information memory device 221 stores setting information the setting information receiver received from the user (specifically, information associating together the MAC addresses of the wireless terminals 30, the assigned addresses assigned to the wireless terminals 30, the reception channels of the wireless terminals 30 receiving transmitted test packets and the modulation format (protocol) of test packets sent by the wireless terminals 30).

The designated condition information memory device 222 stores designated condition information generated by the designated condition information receiver 202 (specifically, information associating together the number of wireless terminals 30, the number of communication paths, the number of communication path sets, the average traffic volume, the transmission form, the reception channel and the modulation format (see FIG. 3)).

The communication setting information memory device 223 stores communication setting information generated by the communication setting information generator 203 (specifically, information associating together the transmission-use assigned address, the receiving-use assigned address (destination address), the packet size indicating the test packet information volume, the transmission timing indicating the timing of sending test packets, the reception channel of receiving terminals, and the modulation format of test packets (see FIG. 4B)).

The receiving data memory device 224 stores measurement data from the wireless terminals 30 received by the measurement data analyzer 204.

The wireless communicator 230 is a wireless communication interface having an antenna (for example, an RF-IC (Radio Frequency Integrated Circuit)). The wireless communicator 230 realizes wireless communication with the wireless terminals 30.

The display device 240 is, for example, a liquid crystal display. The display device 240 displays, for example, a setting screen prompting the user to set setting information, a designation screen prompting the user to set conditions for test communications or an analysis screen indicating PER, throughput and/or the like.

The bus line BL mutually connects the various components 200-240.

The wireless terminals 30 each comprise a controller 300, a setting information memory device 310, a communication setting information memory device 320, a measurement data memory device 330 and a wireless communicator 340.

The controller 300 accomplishes control of the wireless terminal 30. The controller 300 comprises an unrepresented CPU, ROM, and RAM.

Figure 11:
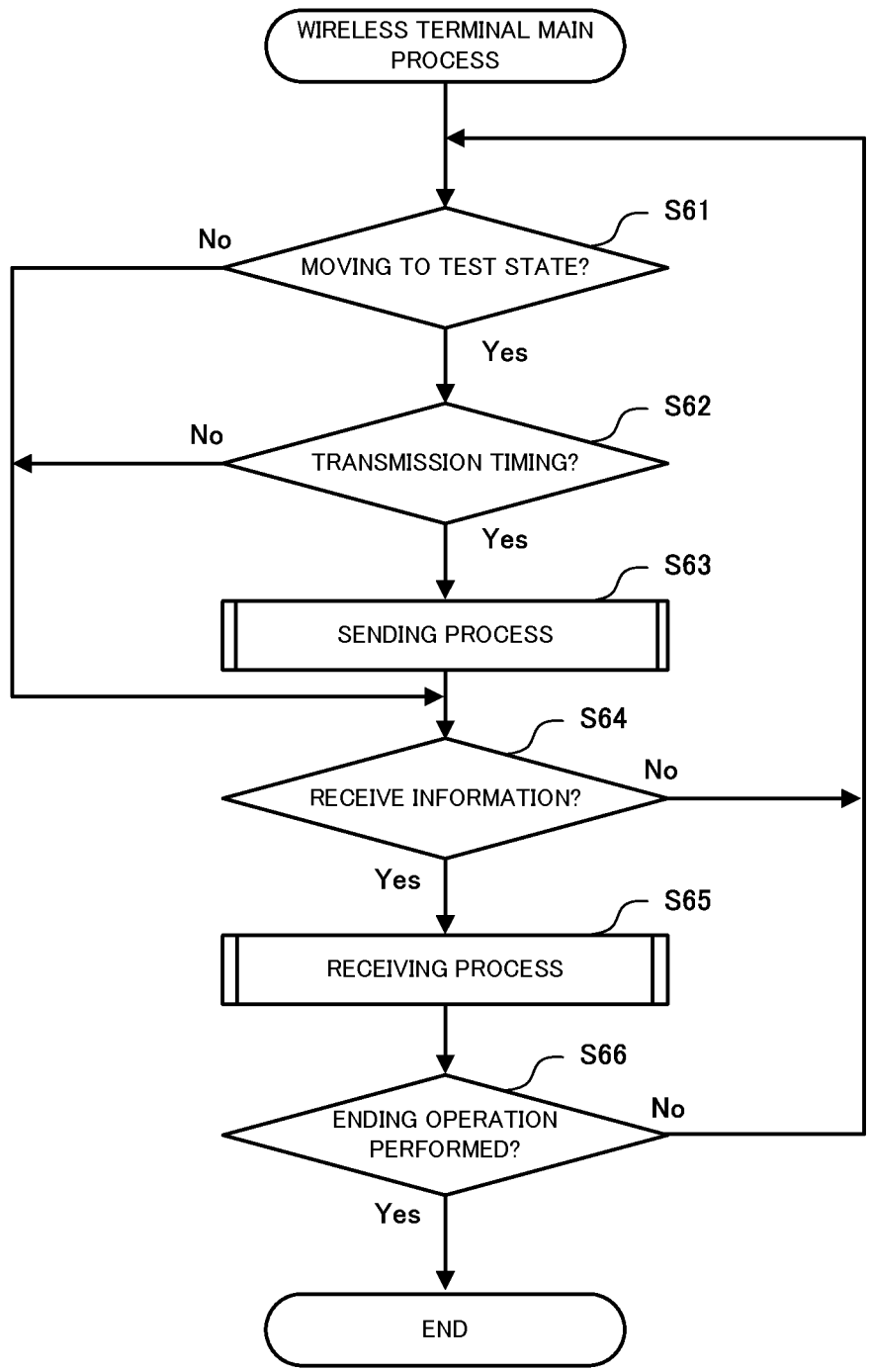
FIG. 11 is a flowchart showing the main process of the wireless terminal.
Figure 12:
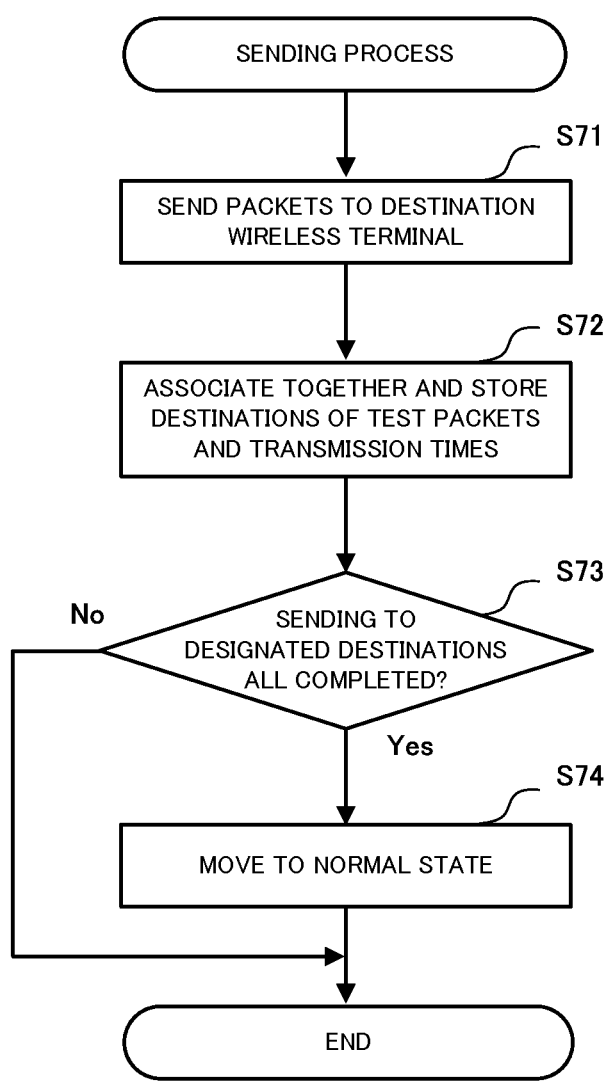
FIG. 12 is a flowchart showing the sending process of the wireless terminal.
Figure 13:
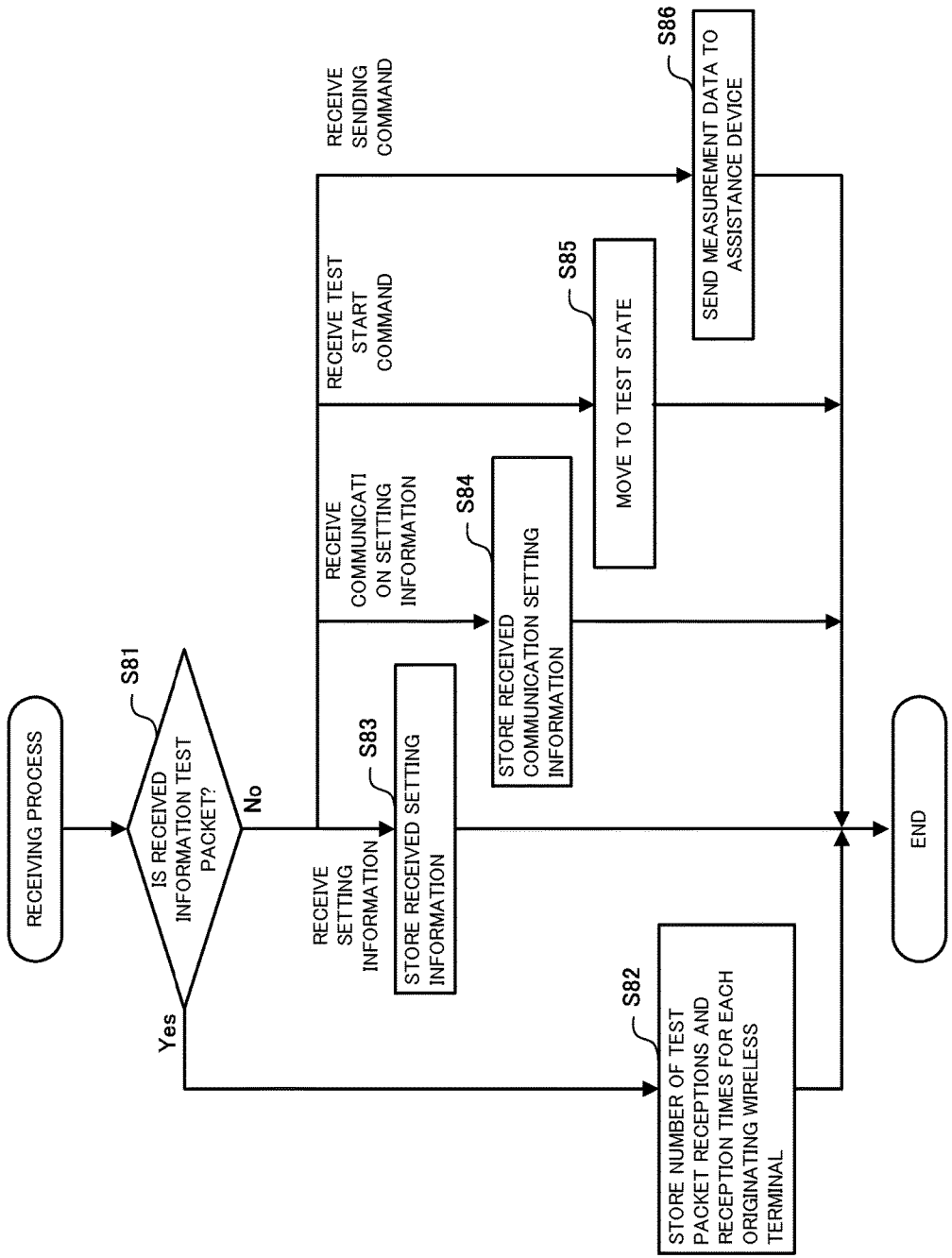
FIG. 13 is a flowchart showing the receiving process of the wireless terminal.

The CPU executes processes shown in the flowcharts for FIGS. 11-13, for example, but executing programs stored in the ROM.

The setting information memory device 310 stores setting information sent from the assistance device 20 (specifically, information associating together the MAC addresses of the wireless terminals 30, the assigned addresses assigned to the wireless terminals 30, the reception channels of the wireless terminals receiving the transmitted test packets and the modulation format (protocol) of the test packets sent by the wireless terminals 30). When setting information is stored in the setting information memory device 310, the controller 300 searches for the MAC address matching the MAC address allocated in advance by itself, from the MAC addresses contained in the stored setting information. Furthermore, the controller 300 makes settings so that wireless communication using the assigned address corresponding to the searched MAC address, the reception channel and the modulation format can be executed with another wireless terminal 30.

The communication setting information memory device 320 stores one item of communication setting information sent from the assistance device 20 when accomplishing test communication (for example, the first item of communication setting information; see FIG. 4B). When one item of communication setting information is stored in the communication setting information memory device 320, the controller 300 searches for an assigned address that matches the assigned address set by itself, from the assigned addresses included in the stored communication setting information. Furthermore, when a test start command sent from the assistance device 20 is received, the controller 300 sends a test packet having the information volume indicated by the packet size to the wireless terminal 30 indicated by the destination address, with a sending frequency indicated by the reception channel, with a transmission timing associated with the searched assigned address. The controller 300 executes this series of actions each time one item of communication setting information sent from the assistance device 20 is received.

The measurement data memory device 330 stores measurement data in which a transmission time and assigned address indicating the destination of the test packet are associated. In addition, the measurement data memory device 330 stores measurement data in which the number of receptions of test packets and the reception times are associated, for each transmission source (transmission terminal) of the test packets.

The wireless communicator 340 is a wireless communication interface having an antenna (for example, an RF-IC). The wireless communicator 340 realizes wireless communication with the assistance device 20.

Figure 6:
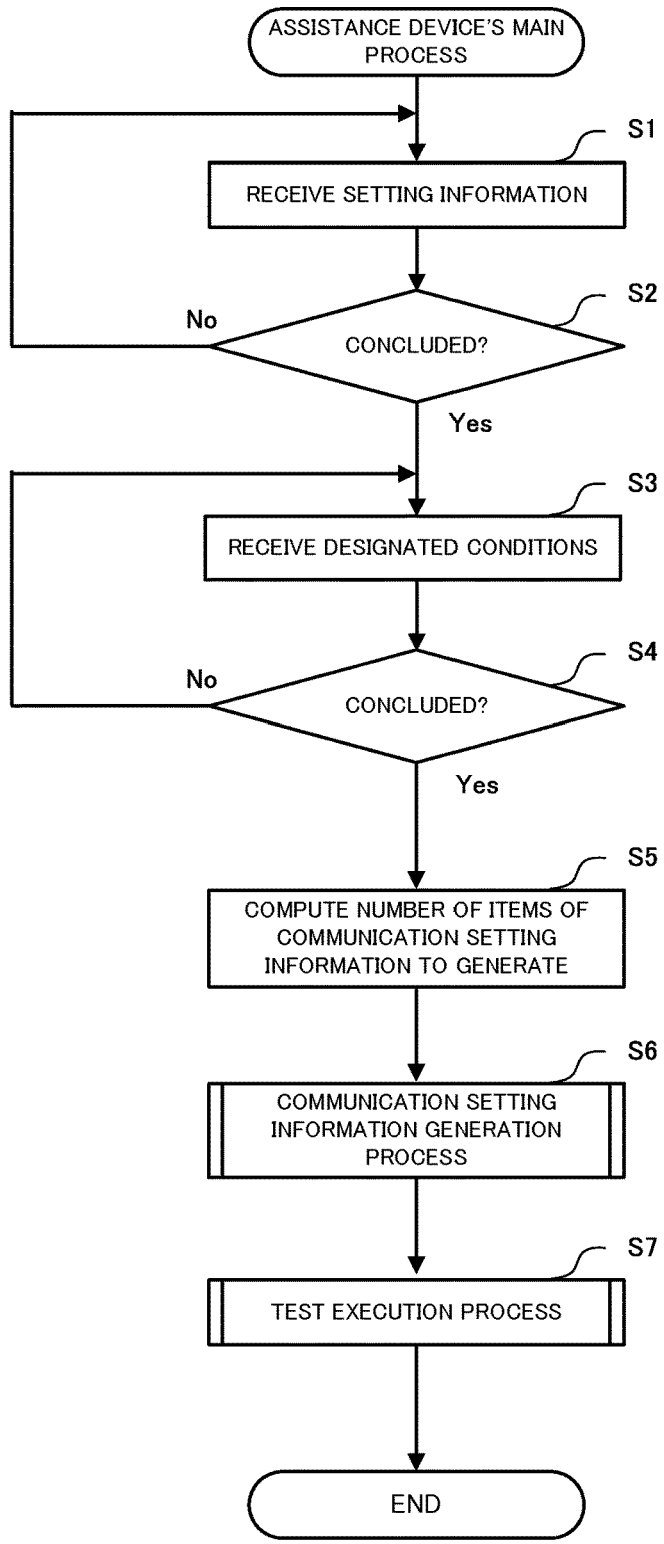
FIG. 6 is a flowchart showing the main process of the assistance device.

When the power source of the above-described assistance device 20 is turned on and execution of test communication is commanded by a user via operation of the input device 210, the controller 200 starts the main process shown in FIG. 6.

In the main process, first the controller 200 (setting information receiver 201) displays on the display device 240 a setting screen that prompts the user to set the setting information (information associating together the MAC addresses of the wireless terminals 30, the assigned addresses assigned to the wireless terminals 30, the reception channels of the wireless terminals 30 and the modulation format of test packets sent by the wireless terminals 30) (step S1). Then, the controller 200 (setting information receiver 201) determines whether or not receiving of setting information has concluded.

When an operation indicating the conclusion of inputting setting information is not accomplished by the input device 210, the controller 200 (setting information receiver 201) determines that receiving of setting information has not concluded (step S2: No), and returns to step S1. On the other hand, when an operation indicating the conclusion of inputting setting information is accomplished by the input device 210, the controller 200 (setting information receiver 201) determines that receiving of setting information has concluded (step S2: Yes), stores the setting information for each wireless terminal 30 set in the setting information memory device 221, and moves to step S3.

In step S3, the controller 200 (designated condition information receiver 202) displays on the display device 240 a designation screen that prompts the user to set conditions for test communication (step S3). The conditions designated by the user are the five conditions of number of wireless terminals 30, number of communication paths, number of communication path sets, average traffic volume and transmission form (see FIG. 3).

After executing step S3, the controller 200 (designated condition information receiver 202) determines whether or not receiving of conditions has concluded (step S4).

When an operation indicating the conclusion of designating conditions has not been accomplished by the input device 210, the controller 200 (the designated condition information receiver 202) determines that receiving of conditions has not concluded (step S4: No), and returns to step S3. On the other hand, when an operation indicating the conclusion of designating conditions has been accomplished by the input device 210, the controller 200 (the designated condition information receiver 202) determines that receiving of conditions has concluded (step S4: Yes), associates the information indicating the reception channel stored in the setting information memory device 221 (information associating the reception channel and the assigned address) and the modulation format to the designated five conditions, and stores the associated designated condition information (see FIG. 3) in the designated condition information memory device 222. Following this, the controller 200 (designated condition information receiver 202) moves to step S5.

In step S5, the controller 200 (communication setting information generator 203) acquires the designated condition information stored in the designated condition information memory device 222 and computes the number of patterns indicating for what patterns it is necessary to accomplish test communications, in other words the number of items of communication setting information to generate, by computing the number of variations included in the designated condition information (step S5). For example, when the designated condition information shown in FIG. 3 is stored in the designated condition information memory device 222, the controller 200 (communication setting information generator 203) computes the number of patterns to be "6" because the number of variations is "2 (corresponding to the number of communication path sets)" and "3 (corresponding to the average traffic volume)".

Following this, the controller 200 (communication setting information generator 203) moves to the communication setting information generation process for generating communication setting information (step S6).

Figure 7:
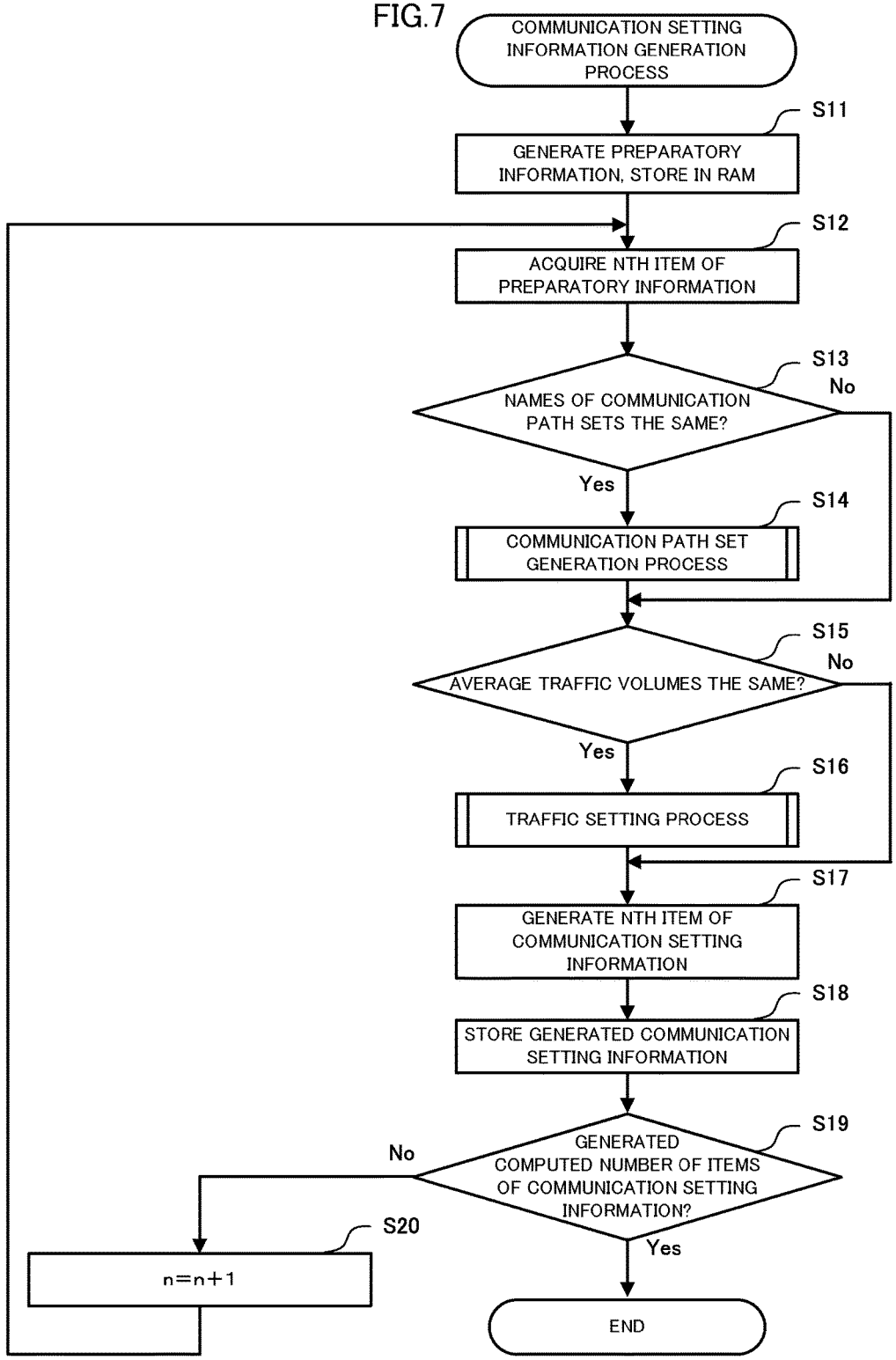
FIG. 7 is a flowchart showing the communication setting information generation process of the assistance device.

The flowchart of the communication information generation process is as shown in FIG. 7. First, the controller 200 (communication setting information generator 203) generates the preparatory information (the number of wireless terminals, number of communication paths, names of communication paths sets and average traffic volume) necessary for generating communication setting information indicating the contents of test communication to be executed by the wireless terminals 30, and stores the generated preparatory information in the RAM (step S11). In step S11, specifically when for example the designated condition information shown in FIG. 3 is stored in the designated condition information memory device 222, the controller 200 (communication setting information generator 203) generates six patterns of preparatory information (first through sixth items of preparatory information) in which the number of wireless terminals 30 and the number of communication paths are "5", the names of the communication pat sets are "first" and "second" and the average traffic volume in each of the communication path sets is "15%", "20%" and "25%". Furthermore, the controller 200 (communication setting information generator 203) stores the generated preparatory information in the RAM (see FIG. 4A).

Following this, the controller 200 (communication setting information generator 203) executes the processes from step S12 on in order to generate communication setting information (see FIG. 4B) indicating the content of test communication to be executed by the wireless terminals 30. The controller 200 (communication setting information generator 203) generates the first item of communication setting information from the first item of preparatory information, and after storing the generated first item of communication setting information in the communication setting information memory device 223, generates the second item of communication setting information from the second item of preparatory information. That is to say, the controller 200 (communication setting information generator 203) generates and stores one item of communication setting information, and after that generates and stores a new item of communication setting information.

In step S12, the controller 200 (communication setting information generator 203) acquires from the RAM the nth item of preparatory information (where n is a natural number whose initial value is 1). Following this, the controller 200 (communication setting information generator 203) determines whether or not to generate a communication path set different from the previously generated communication path set by determining whether or not the name of the communication path set included in the acquired nth item of preparatory information is the same as the name of the communication path set included in the n−$1^{st}$ item of preparatory information (step S13). The natural number n is counted by a counter possessed by the controller 200.

In step S13, when the controller 200 (communication setting information generator 203) for example generates the first item of communication setting information corresponding to the first item of preparatory information (see FIG. 4A), communication path sets have not yet been generated, so the determination is that a communication path set different from the previously generated communication path set is generated (step S13: Yes). On the other hand, when the controller 200 (communication setting information generator 203) for example generates the second item of communication setting information corresponding to the second item of preparatory information, because the name "first communication path set" included in the second item of preparatory information is the same as the name included in the first item of preparatory information (see FIG. 4A), or in other words, because the first communication path set has already been generated, the determination is that a communication path set the same as the communication path set generated previously is generated (step S13: No). When the determination is Yes in step S13, the controller 200 (communication setting information generator 203) executes the communication path set generation process to generate a communication path set (step S14). On the other hand, when the determination is No in step S13, the controller 200 (communication setting information generator 203) skips the communication path set generation process for generating communication path sets (step S14).

Figure 8:
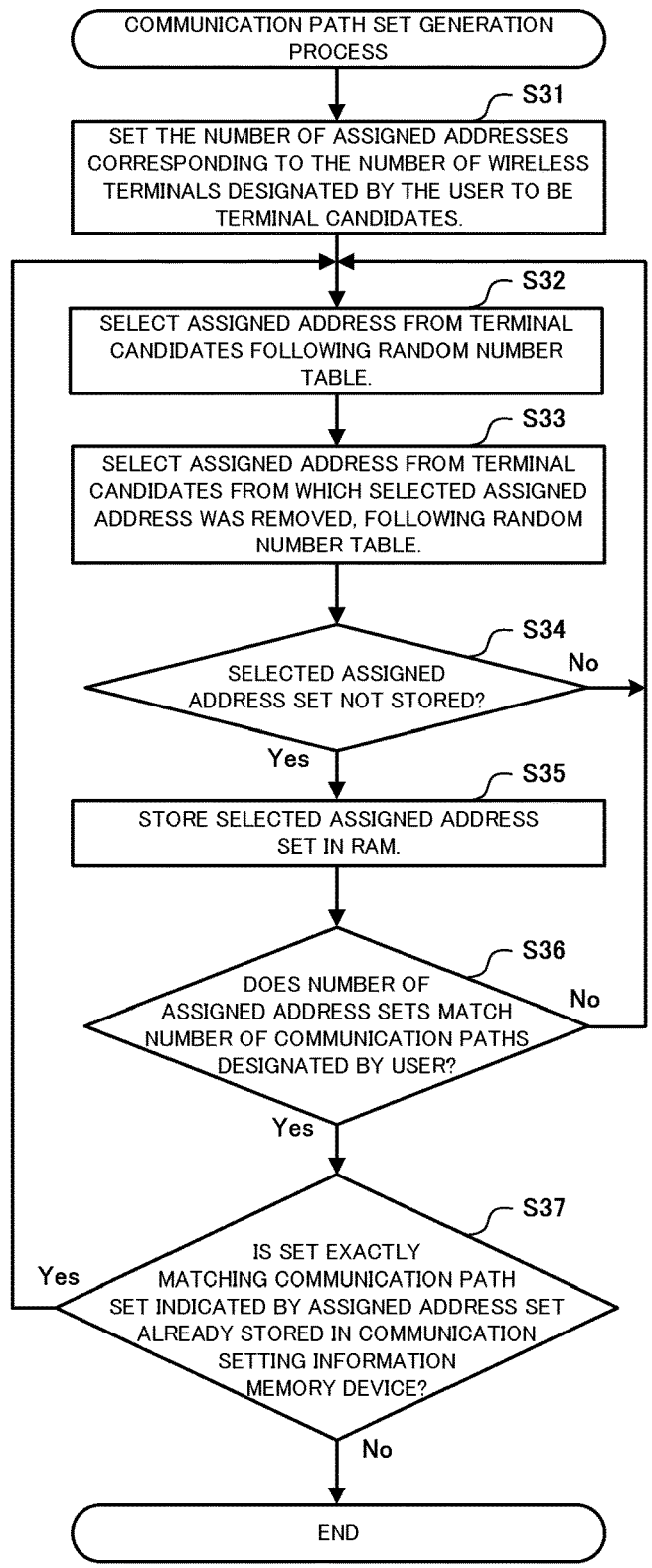
FIG. 8 is a flowchart showing the communication path set generation process of the assistance device.

The flowchart of the communication path set generation process of step S14 is as shown in FIG. 8. In the communication path set process, first the controller 200 (communication setting information generator 203) extracts the number of assigned addresses corresponding to the number of wireless terminals 30 designated by the user (the number of wireless terminals 30 included in the preparatory information stored in the RAM) from the setting information memory device 221, and sets the extracted assigned addresses as candidates (terminal candidates) for wireless terminals to send and receive test packets (step S31).

Following this, the controller 200 (communication setting information generator 203) selects (extracts), from the assigned addresses extracted as terminal candidates, one assigned address following the random number table (the random number table associating the assigned addresses extracted as terminal candidates and random numbers output from a random number generator housed in the controller 200) (step S32). Through this, the controller 200 (communication setting information generator 203) selects the wireless terminal 30 indicated by the selected assigned address as the sending terminal for sending test packets by determining the selected assigned address as the transmission-use assigned address.

Next, the controller 200 (communication setting information generator 203) deletes the assigned address selected in step S32 from the assigned addresses extracted as terminal candidates, and selects (extracts) one assigned address from the post-deletion assigned addresses, following a random number table (a random number table associating the post-deletion assigned addresses and random number values output from a random number generator housed in the controller 200) (step S33). Through this, the controller 200 (communication setting information generator 203) selects the wireless terminal 30 indicated by the selected assigned address as the receiving terminal for receiving transmitted test packets, by deciding on the selected assigned address as the receiving-use assigned address.

Then, the controller 200 (communication setting information generator 203) determines whether the assigned address set in which the selected transmission-use assigned address and the selected receiving-use assigned address are one set has already been recorded (whether the same assigned address set is already retained in the RAM) (step S34). In other words, a determination is made as to whether the communication path consisting of the wireless terminals indicated by the selected assigned addresses is not already being used by the same communication setting information (step S34). When the determination is that the assigned address set is already recorded (step S34: No), the controller 200 (communication setting information generator 203) deletes the assigned address set selected this time and moves to step S32 in order to select again a transmission-use assigned address and a receiving-use assigned address.

On the other hand, when it is determined that the assigned address set has not been recorded (step S34: Yes), the controller 200 (communication setting information generator 203) retains (stores) that assigned address set in the RAM (step S35).

In this manner, when the communication path consisting of the wireless terminals 30 indicated by the selected assigned addresses, that is to say the assigned address set, has already been selected for the same communication setting information, the controller 200 (communication setting information generator 203) again selects a transmission-use assigned address and a receiving-use assigned address. In other words, the controller 200 (communication setting information generator 203) makes determinations so that the same communication path does not redundantly exist. Hence, the controller 200 (communication setting information generator 203) can compose communication path sets of communication paths that are not redundant. Accordingly, the assistance device 20 can prevent sending and receiving of test packets through redundant communication paths having an extremely high probability of producing the same sending and receiving results.

After executing step S35, the controller 200 (communication setting information generator 203) determines whether or not the number of assigned address sets retained (stored) the RAM is the same as the number of communication paths designated by the user (the number of communication paths included in the preparatory information stored in the RAM) (step S36). When it is determined that the number of assigned address sets stored in the RAM is smaller than the number of communication paths designated by the user (in other words, the number stored) (step S36: No), the controller 200 (communication setting information generator 203) moves to step S32 in order to increase the stored number of assigned address sets. In this manner, the controller 200 (communication setting information generator 203) determines No in step S36 and executes generation of assigned address sets until the recorded number of assigned address sets designated by the user is recorded.

When it is determined in step S36 that the number of assigned address sets stored in the RAM is the same as the number of communication paths designated by the user (step S36: Yes), the controller 200 (communication setting information generator 203) determines whether the accumulation of assigned address sets that is the exact same as all of the assigned address sets stored in the RAM, that is to say the exact same communication path sets as the communication path sets consisting of all assigned address sets stored in the RAM, is not already stored in the communication setting information memory device 223, and through this determines whether the exact same communication path sets have not already been selected by other communication setting information already stored (step S37).

When it is determined that the exact same communication path sets are already stored in the communication setting information memory device 223 (step S37: Yes), the controller 200 (communication setting information generator 203) returns to step S32 in order to again select different communication path sets.

On the other hand, when it is determined that the exact same communication path sets are not already stored in the communication setting information memory device 223 (step S37: No), the controller 200 (communication setting information generator 203) concludes the communication path set generation process.

In this manner, when the exact same communication path sets as the communication path sets consisting of all assigned address sets stored in the RAM are already stored in the communication setting information memory device 223, the controller 200 (communication setting information generator 203) again selects a different communication path set. That is to say, the controller 200 (communication setting information generator 203) makes determinations so that the exact same communication path sets do not redundantly exist using a series of test communications accomplished in accordance with each pattern. Hence, it is possible for the controller 200 (communication setting information generator 203) to cause the series of tests to be executed by the wireless terminals 30 through non-redundant communication path sets. Accordingly, the assistance device 20 can prevent sending and receiving of test packets through redundant communication paths having an extremely high probability of producing the same sending and receiving results from being accomplished by a series of tests.

When the communication path set generation process concludes, the controller 200 (communication setting information generator 203) executes step S15 in FIG. 7. That is to say, the controller 200 (communication setting information generator 203) determines whether or not to use a different average traffic volume from the average traffic volume used the previous time, by determining whether or not the average traffic volume included in the nth item of preparatory information acquired from the RAM in step S12 is the same as the average traffic volume included in the n−1$^{st}$ item of preparatory information (step S15). In this step S15, when the average traffic volume corresponding to the first item of preparatory information is used, for example, the controller 200 (communication setting information generator 203) determines to use an average traffic volume differing from the average traffic volume used the previous time, from the fact that the average traffic volume has not yet been used (step S15: Yes). Similarly, when the average traffic volume corresponding to the second item of preparatory information is used, for example (see FIG. 4A), the controller 200 (communication setting information generator 203) determines to use an average traffic volume differing from the average traffic volume used the previous time (step S15: Yes) because the average traffic volume differs from the average traffic volume corresponding to the first item of preparatory information (see FIG. 4A).

On the other hand, when the average traffic volume corresponding to the nth item of preparatory information is used, if that average traffic volume is the same as the average traffic volume corresponding to the n−1$^{st}$ item of preparatory information, the controller 200 (communication setting information generator 203) makes the determination to use the same average traffic volume as the average traffic volume previously used (step S15: No).

When the determination in step S15 is Yes, the controller 200 (communication setting information generator 203) executes a traffic setting process (step S16) that decides the packet size of the test packets. On the other hand, when the determination in step S15 is No, the controller 200 (communication setting information generator 203) skips the traffic setting process (step S16).

Figure 9:
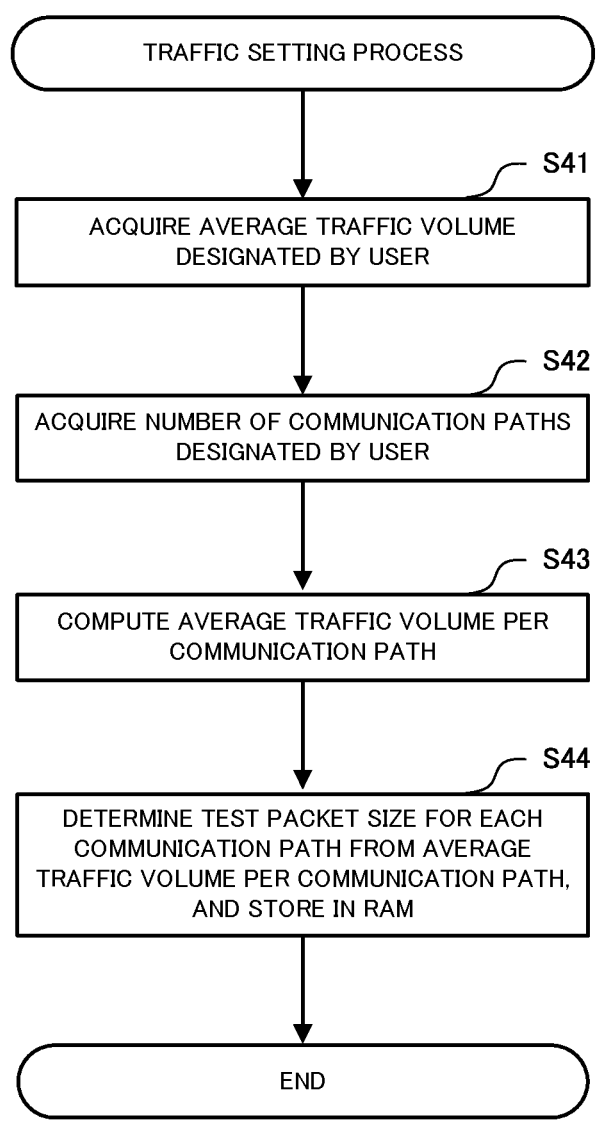
FIG. 9 is a flowchart showing the traffic setting process of the assistance device.

A flowchart of the traffic setting process of step S16 is as shown in FIG. 9. In the traffic setting process, first the controller 200 (communication setting information generator 203) acquires the average traffic volume designated by the user, that is to say the average traffic volume included in the nth item (where n is a natural number whose initial value is 1) of preparatory information stored in the RAM (step S41).

Following this, the controller 200 (communication setting information generator 203) acquires the number of communication paths designated by the user, that is to say the number of communication paths included in the nth item (where n is a natural number whose initial value is 1) of preparatory information stored in the RAM (step S42).

Then, the controller 200 (communication setting information generator 203) computes the average traffic volume per communication path by dividing the average traffic volume acquired in step S41 by the number of communication paths acquired in step S42 (step S43).

Following this, the controller 200 (communication setting information generator 203) decides on the packet size indicating the information volume of the test packets to be sent, from the average traffic volume per communication path computed in step S43, for each communication path, and stores the packet size in the RAM (step S44). Specifically, in step S44 the communication setting information generator 203 decides on the information volume (packet size) corresponding to the average traffic volume per communication path, from the average traffic volume per communication path and the maximum information volume that can be sent when the average traffic volume is 100%. Then, the controller 200 (communication setting information generator 203) associates the packet size decided on with the assigned address set and stores the result in a RAM (unrepresented).

Following execution of step S44, the controller 200 (communication setting information generator 203) concludes the traffic setting process.

When the traffic setting process concludes, the controller 200 (communication setting information generator 203) generates the nth item (where n is a natural number whose initial value is 1) of the communication setting information (step S17). Specifically, the controller 200 (communication setting information generator 203) generates the nth item of communication setting information as follows.

That is to say, the controller 200 (communication setting information generator 203) acquires the assigned address set stored first (the assigned address set selected first), out of all assigned address sets, from the RAM. Then, the controller 200 (communication setting information generator 203) sets the sending terminal for test packets to be the wireless terminal 30 indicated by the transmission-use assigned address included in the assigned address set stored first.

Next, the controller 200 (communication setting information generator 203) acquires the transmission form stored in the designated information memory device 222 (see FIG. 3). Then, the controller 200 (communication setting information generator 203) sets (decides on) the transmission timing with which the wireless terminal 30 indicated by the transmission-use assigned address sends test packets, from the acquired transmission form, and the fact that the sequence in which the assigned address set was stored in the RAM is first.

Then, the controller 200 (communication setting information generator 203) sets the destination of the test packet to be the wireless terminal 30 indicated by the receiving-use assigned address included in the assigned address set stored first.

Furthermore, the controller 200 (communication setting information generator 203) acquires from the RAM the packet size corresponding to the assigned address set stored first and sets the information volume of the test packet to be the acquired packet size.

In addition, the controller 200 (communication setting information generator 203) acquires the reception channel corresponding to the assigned address matching the receiving-use assigned address, out of the information indicating reception channel stored in the designated condition information memory device 222 (see FIG. 3). Then, the controller 200 (communication setting information generator 203) sets the acquired channel that matches the reception channel of the receiving terminal to be the sending frequency of the test packets.

Finally, the controller 200 (communication setting information generator 203) acquires the modulation format stored in the designated condition information memory device 222 (see FIG. 3). Then, the controller 200 (communication setting information generator 203) sets the acquired modulation format to be the modulation format of the test packets.

By executing the above-described process, the controller 200 (communication setting information generator 203) in step S17 generates for example the first column of information out of the first item of communication setting information (see FIG. 4B). Following this, the controller 200 (communication setting information generator 203), by executing the above-described process as many times as the number of all assigned address sets stored in the RAM, for example, generates all columns of information for the first item of communication setting information (see FIG. 4B).

Following execution of step S17, the controller (communication setting information generator 203) stores the nth item of communication setting information generated in step S17 in the communication setting information memory device 223 (step S18).

Then, the controller 200 (communication setting information generator 203) determines whether or not the number of items of communication setting information computed in step S5 (see FIG. 6) has been generated (step S17). Specifically, the controller 200 (communication setting information generator 203) determines whether or not the number computed in step S5 (see FIG. 6) and the number of items of communication setting information stored in the communication setting information memory device 223 match (step S19).

When the determination is that the number of items of communication setting information recorded in the communication setting information memory device 223 is smaller than the number computed in step S5, the controller 200 (communication setting information generator 203) increments the natural number (counter) n by one in order to generate new communication setting information (step S20), and then returns to step S12. On the other hand, when the determination is that the number computed in step S5 and the number of items of communication setting information stored in the communication setting information memory device 223 match, the controller 200 (communication setting information generator 203) concludes the communication setting information process.

Upon concluding the communication setting information generation process, the controller 200 begins the test execution process (step S7) shown in FIG. 6.

Figure 10:
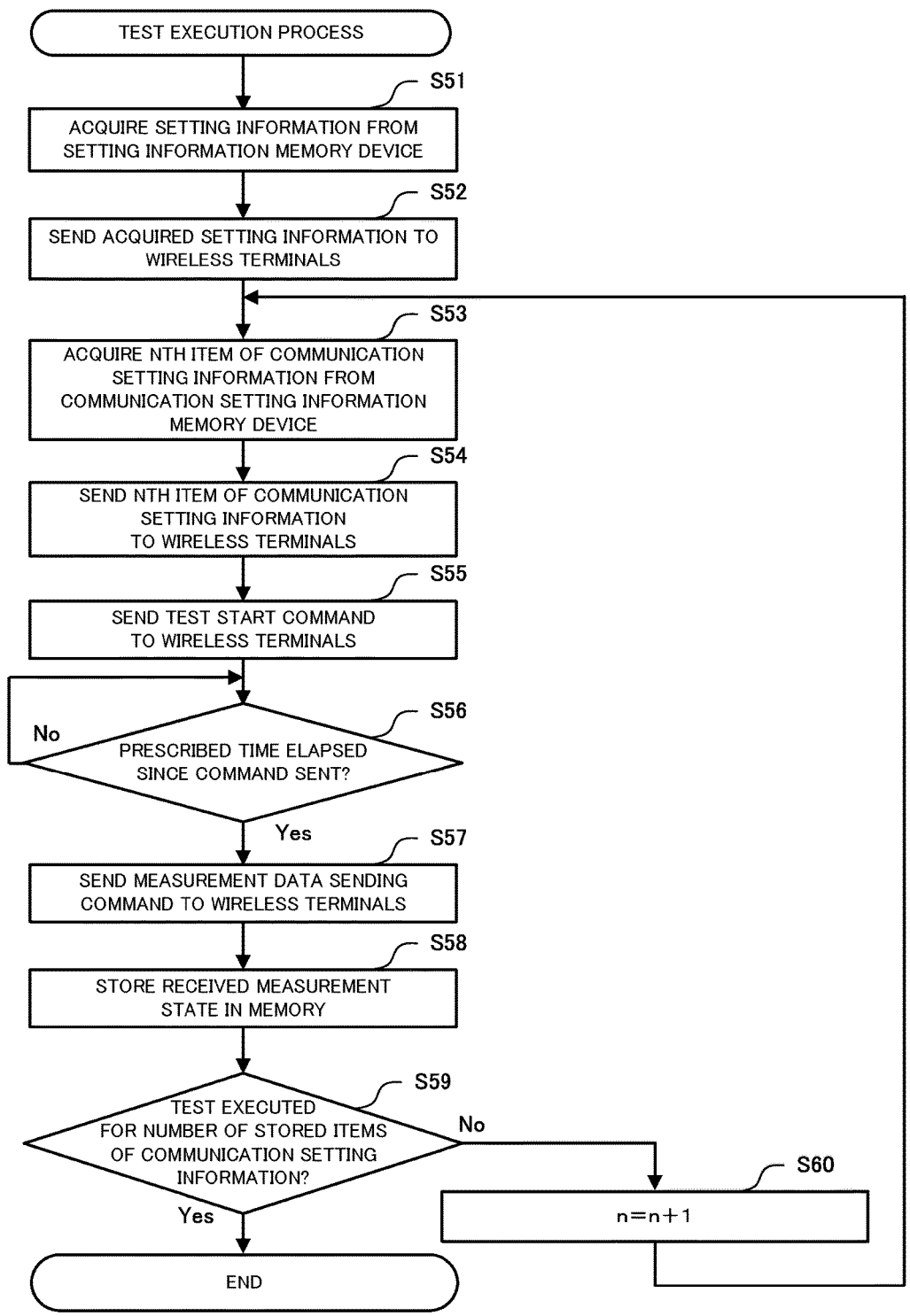
FIG. 10 is a flowchart showing the test execution process of the assistance device.

A flowchart of the test execution process of step S7 is a shown in FIG. 10. In the test execution process, first the controller 200 acquires setting information from the setting information memory device 221 (step S51). Then, the controller 200 sends the acquired setting information (specifically, information associating the MAC addresses of the wireless terminals 30, the assigned addresses of the wireless terminals 30, the reception channels of the wireless terminals 30 for receiving test packets sent, and the modulation format of test packets sent by the wireless terminals 30) to the wireless terminals 30 indicated by the assigned address sets included in the communication setting information stored in the communication setting information memory device 223 (step S52).

Upon receiving the setting information, the wireless terminals 30 make settings so as to be able to execute wireless communication with other wireless terminals 30 using the assigned addresses, the reception channels and the modulation format indicated by the setting information.

Following this, the controller 200 acquires the nth item (where n is a natural number whose initial value is 1) of communication setting information from the communication setting information memory device 223 (step S53), and sends the acquired nth item of communication setting information (see FIG. 4B) to the wireless terminals 30 indicated by the assigned address sets included in communication setting information stored in the communication setting information memory device 223 (step S54).

After receiving and storing in memory the nth item of communication setting information, the wireless terminals 30, upon receiving a test start command from the assistance device 20, send the test packets in accordance with the contents indicated by the nth item of communication setting information.

After execution of step S54, the controller 200 sends the test start command commanding the start of the test, to the wireless terminals 30 indicated by the assigned address sets included in the items of communication setting information stored in the communication setting information memory device 223 (step S55).

Following this, the controller 200 determines whether or not a prescribed time has elapsed, that is to say determines whether or not a planned time for concluding the test has elapsed (step S56).

When it is determined that the prescribed time has not elapsed from after sending of the test start command (step S56: No), the controller 200 repeatedly executes step S56 until it is determined that the prescribed time has elapsed. On the other hand, when it is determined that the prescribed time has elapsed from after sending of the test start command (step S56: Yes), the controller 200 sends a transmission command for measurement data (results of sending and receiving test packets) to the wireless terminals 30 indicated by the assigned address sets included in the items of communication setting information stored in the communication setting information memory device 223 (step S57).

Furthermore, the controller 200 receives the measurement data sent from the wireless terminals 30 and stores the received measurement data in the received data memory device 224 (step S58). In this manner, by storing the measurement data sent from the wireless terminals 30 in the received data memory device 224, it is possible for the controller 200 to analyze the measurement data stored in the received data memory device 224 and to display on the display device 240 an analysis screen showing the PER (Packet Error Rate), throughput and/or the like.

Following execution of step S58, the controller 200 determines whether or not test communication has been executed for the same number of times as the items of communication setting information stored in the communication setting information memory device 223 (step S59). Specifically, in step S59, the controller 200 determines whether or not the number of times sending the test start command matches the number of items of communication setting information stored in the communication setting information memory device 223.

When it is determined that the number of times sending the test start command is smaller than the number of items of communication setting information stored in the communication setting information memory device 223 (step S59: No), the controller 200 increments the natural number (counter) n by one in order to execute a new test (step S60) and moves to step S53. On the other hand, when it is determined that the number of times sending the test start command matches the number of items of communication setting information stored in the communication setting information memory device 223 (step S59: Yes), the controller 200 concludes the test execution process.

In this manner, the controller 200 sends the items of communication setting information stored in the communication setting information memory device 223 to the wireless terminals 30 one at a time in order from the first item of communication setting information, each time one test ends.

Upon concluding the test execution process, the controller 200 concludes the main process shown in FIG. 6.

On the other hand, in each of the wireless terminals 30, when the power source of the wireless terminals 30 is turned on, the controller 300 starts the main process shown in FIG. 11.

In the main process, first the controller 300 determines whether or not the wireless terminal 30 is in a state capable of sending test packets, by determining whether or not the wireless terminal 30 has moved into a test state (step S61). The controller 300 determines whether or not the wireless terminal 30 is in a test state through a flag possessed by the controller 300. For example, the controller 300 switches the flag with the below-described sending process (step S63) and receiving process (step S65) and may determine whether the state is a test state indicating a state in which test packets can be sent or a normal state indicating a state in which test packets are not sent. Upon receiving a test start command sent from the assistance device 20, the wireless terminals 30 move from the normal state to the test state.

When it is determined that the state has moved to the test state (step S61: Yes), the controller 300 determines whether or not the timing is timing for sending test packets, by comparing the transmission timing included in the communication setting information stored in the communication setting information memory device 320 (see FIG. 4B) and the elapsed time from after reception of the test start command as measured by an internal clock (step S62). When it is determined that the timing is timing for sending the test packet (step S62: Yes), the controller 300 starts the sending process (step S63). On the other hand, when it is determined that the timing is not timing for sending the test packet (step S62: No), the controller 300 skips the sending process.

A flowchart for the sending process of step S63 is as shown in FIG. 12. In the sending process, first the controller 300 specifies the subsequent information associated with the transmission timing that matches the elapsed time from after reception of the test start command, that is to say information indicating the destination address (the assigned address indicating the receiving terminal), the packet size, the reception channel and the modulation format, from the communication setting information stored in the communication setting information memory device 320 (see FIG. 4B). Then, the controller sends the test packet with the specified packet size, reception channel (frequency) and modulation format to the wireless terminal 30 indicated by the destination address (assigned address) (step S71)

Following this, the controller 300 associates together and stores in the measurement data memory device 330 the assigned address indicating the destination of the test packet and the transmission time (current time measured by the clock) (step S72).

Then, the controller 300 determines whether or not sending of test packets to all destination designated by the communication setting information stored in the communication setting information memory device 320 has concluded (step S73).

When it is determined that sending test packets to all designations designated by the communication setting information has concluded (step S73: Yes), the controller 300 causes the wireless terminal 30 to move to the normal state indicating a state in which test packets are not sent (step S74) and concludes the sending process. When it is determined that sending test packets to all destinations designated by the communication setting information has not concluded (step S73: No), the controller skips step S74 and concludes the sending process.

When the sending process concludes, or when the determination in step S61 is No, the controller 300 determines in the determination of S64 shown in FIG. 11 whether some kind of information has been received (step S64). When the determination is that no information has been received (step S64: No), the controller 300 returns to step S61.

On the other hand, when the determination is that some kind of information has been received (step S64: Yes), the controller 300 moves to step S65.

A flowchart of the receiving process of step S65 is as shown in FIG. 13. In the receiving process, first the controller 300 determines if the information received is a test packet (step S81).

When the determination is that the information received is a test packet (step S82: Yes), the controller 300 associates together the number of times receiving test packets and the reception times (current times measured by the clock), stores the information in the measurement data memory device 330 for each assigned address indicating a transmission source (for each wireless terminal 30 that is a transmission source) (step S82) and concludes the receiving process.

On the other hand, when the determination is that the information received is not a test packet (step S82: No), the information received is either setting information, communication setting information, a test start command or a transmission command, sent from the assistance device 20, so the controller 300 determines to which of these four the information corresponds (step S81: Yes).

On the other hand, when it is determined that the information received is setting information, the controller 300 stores the setting information received in the setting information memory device 310 and accomplishes settings in accordance with the setting information, because the information is setting information received from the assistance device 20 prior to the start of testing (step S83). Specifically, when the setting information received is stored in the setting information memory device 310, the controller 300 searches from the MAC addresses included in the setting information that was stored for a MAC address that matches the MAC address allocated by itself, out of the setting information stored (the MAC addresses of the wireless terminals 30, the assigned addresses assigned to the wireless terminals 30, the reception channels indicating channels for receiving test packets sent, and the modulation format (protocol) of the test packets). Furthermore, the controller 300 makes settings so that wireless communication using the assigned address associated with the searched MAC address, the reception channel and the modulation format can be executed with another wireless terminal 30.

On the other hand, when it is determined that the information received is communication setting information, the controller 300 stores the communication setting information received (see FIG. 4B) in the communication setting information memory device 320 (step S84). When one item of communication setting information is stored in the communication setting information memory device 320, the controller 300 searches for an address matching the assigned address set by itself from the assigned addresses included in the communication setting information stored. When the test start command sent from the assistance device 20 is received, the controller 300 sends a test packet with information volume indicated by the packet size to the wireless terminal 30 indicated by the destination address at a sending frequency indicated by the reception channel, with a transmission timing associated with the assigned address searched.

On the other hand, when the determination is that the information received is a test start command commanding the start of testing, the controller 300 causes the wireless terminal 30 to move from the normal state indicating a state in which test packets are not sent to the test state indicating a state in which test packets can be sent (step S85) and concludes the receiving process.

In addition, when the determination is that the information received is a sending command requiring sending of measurement data, the controller 300 sends the measurement data stored in the measurement data memory device 310 to the assistance device 20 (step S86) and concludes the receiving process.

When the above-described receiving process concludes, the controller 300 determines through the determination in step S66 shown in FIG. 11 whether or not a conclusion operation by the user is accomplished for example via the keyboard (step S66). When the determination is that a conclusion operation by the user has not been accomplished (step S66: No), the controller returns to step S61. On the other hand, when the determination is that a conclusion operation by the user has been accomplished (step S66: Yes), the controller concludes the main process.

As described above, the wireless terminal 30 accomplishes sending and receiving of test packets among wireless terminals 30, in other words accomplishes test communication, following contents designated by communication setting information sent from the assistance device 20 of this exemplary embodiment. This test communication is tests changing the wireless terminal 30 sending test packets and the wireless terminal 30 receiving the test packets. In this manner, the assistance device 20 causes sending and receiving of test packets (test communications) to be executed in a prescribed order in the wireless terminals 30 after causing the wireless terminal 30 sending test packets and the wireless terminal 30 receiving test packets to be changed through the various types of information sent. Hence, with the assistance device 20, it is possible to assist in creating a test communication execution screen for what order the series of communications from sending to receiving test packets is accomplished in the wireless terminal 30. In addition, when the content of the designated condition information (see FIG. 3) stored in the designated condition information memory device 222 is designated by the user, the assistance device 20 generates communication setting information. Here, the content of the designated condition information is content not requiring advanced specialized knowledge. Hence, it is possible for even a user without specialized knowledge to cause test communication in accordance with the content designated by the communication setting information to be executed by the wireless terminals 30.

In addition, by causing the communication setting information to be received by the wireless terminal 30, the assistance device 20 causes sending and receiving of test packets (test communications) in accordance with the content designated by the communication setting information, so it is not necessary for the user to operate the wireless terminal 30 during test communications. Consequently, the user does not need to be present at execution of the test communications. Furthermore, because the presence of the user is unnecessary during test communications, with the assistance device 20 it is possible to cause execution of test communications in a state with no effects from outside interference (radio wave reflections and/or the like) caused by the user's presence. In addition, the assistance device 20 generates communication setting information for the number of patterns corresponding to the conditions designated by the user (see FIGS. 4A, 4B), and causes this number of tests of the communication setting information to be executed by the wireless terminals 30 with one round of test communications. Hence, with the assistance device 20, it is possible to cause the necessary tests to be executed at one time.

In addition, when communication setting information is generated in order for test packets to be sent and received among the wireless terminals 30, the assistance device 20 according to this exemplary embodiment determines whether or not the same communication paths are not already selected so that the same communication paths do not redundantly exist. Hence, it is possible for the assistance device 20 to compose communication path sets with non-redundant communication paths. Accordingly, the assistance device 20 can prevent sending and receiving of test packets through redundant communication paths, for which there is an extremely high probability of the same sending and receiving results.

In addition, the assistance device 20 of this exemplary embodiment, when generating communication setting information in order to cause test packets to be sent and received by the wireless terminals 30, makes determinations so that completely same communication path sets do not redundantly exist, through a series of test communications accomplished in accordance with each pattern. Hence, the assistance device 20 can cause the series of tests to be executed by the wireless terminals 30 through non-redundant communication path sets. Accordingly, the assistance device 20 can prevent sending and receiving of test packets through redundant communication paths having an extremely high probability of producing the same sending and receiving results from being accomplished by a series of tests.

The exemplary embodiment of the present disclosure is described above, but the present disclosure is not limited to the above-described exemplary embodiment, for various variations and applications are possible.

For example, the assistance device 20 according to the above-described exemplary embodiment sent communication setting information stored in the communication setting information memory device 223 to the wireless terminals 30, but this is intended to be illustrative and not limiting. That is to say, it would be fine for the assistance device 20 to be such that when input of changes in communication setting information stored in the communication setting information memory device 223 (the communication setting information generated by the communication setting information generator 203) is accomplished by operation of the input device 210 by the user, communication setting information reflecting the received changes in the communication setting information stored in the communication setting information memory device 223 is regenerated and the regenerated communication setting information is stored in the communication setting information memory device 223. Specifically, when changes in the execution plan generated by the plan generator are received by user operation of the input device 210, the assistance device 20 (communication setting information generator 203) deletes the information of the part corresponding to information indicating the contents of the received changes and regenerates the execution plan with the information indicating the contents of the changes received replacing the deleted information. Furthermore, it would be fine for the assistance device 20 to send the regenerated communication setting information to the wireless terminals 30. Examples of such changes by the user are, for example, changing the destination address, changing the packet size, changing the transmission timing and/or the like. Through these changes, it is possible for the user to make the test communications as desired.

In addition, the assistance device 20 of the above-described exemplary embodiment causes sending and receiving of test packets (test communications) in accordance with contents commanded by the communication setting information to be executed by the wireless terminals 30 by causing the wireless terminals 30 to receive the communication setting information, but this is intended to be illustrative and not limiting. That is to say, it would be fine for the assistance device 20 to form a screen (for example, a screen displaying the communication setting information shown in FIG. 4B) with the communication setting information without sending the communication setting information to the wireless terminals 30, and to display the screen on the display device 240. Even with this display, it is possible to assist in creation of an execution plan for test communication of in what order the series of communications from sending to receiving the test packets is to be accomplished by the wireless terminals 30.

In addition, the above-described assistance device 20, when generating the communication setting information for causing test packets to be sent and received by the wireless terminals 30, makes the determination of step S37 (see FIG. 8) so that exact same communication path sets do not exist redundantly, by a series of test communications accomplished in response to the patterns, but this is intended to be illustrative and not limiting. That is to say, by a series of test communications accomplished in response to the patterns, it is possible for the assistance device 20 to skip step S37 in cases in which it would be fine for the exact same communication path sets to exist redundantly. In this case, when a Yes determination is made in step S36 (see FIG. 8), it would be fine for the assistance device 20 to conclude the communication path set generation process (see FIG. 8).

In addition, the above-described assistance device 20 was set so that each wireless terminal 30 can execute with another wireless terminal 30, by receiving from the user input of setting information for enabling communication among the wireless terminals 30, and sending the setting information received (the information stored in the setting information memory device 221) to the wireless terminals 30, but this is intended to be illustrative and not limiting. That is to say, it would be fine for the assistance device 20 to acquire information associating together the current setting information, specifically the MAC address, the assigned address, the reception channel and the modulation format (protocol) of the test packets, from the wireless terminals 30, and to store the acquired setting information in the setting information memory device 221. With an assistance device 20 having this composition, the user need not designate the setting information.

In addition, the above-described assistance device 20 sent test packets of a fixed packet size to the wireless terminals 30, but this is intended to be illustrative and not limiting. That is to say, it would be fine for the assistance device 20 to cause test packets whose packet size is changed within a range that satisfies the computed average traffic volume per communication path to be sent to the wireless terminals 30. In this case, it is possible to cause the wireless terminals 30 to execute test communication realizing traffic near actual communication conditions.

In addition, the above-described assistance device 20 in step S33 (see FIG. 8) selected the assigned address in accordance with a random number table from terminal candidates with assigned addresses selected in step S32 removed. That is to say, the assistance device 20 had a composition such that the assigned address selected in step S32 is not selected in step S33, but this is intended to be illustrative and not limiting. That is to say, it would be fine to select the assigned address in step S33 in accordance with the random number table from terminal candidates including the assigned address selected in step S32. With this composition, there are cases in which the assigned address selected in step S33 and the assigned address selected in step S32 are the same. In this case, test communication of receiving with the same device a test packet sent from the same device (for example, test communication in which a test packet sent from the first wireless terminal 30 is received by the first wireless terminal 30) is executed by the wireless terminal 30.

In addition, the above-described assistance device 20 in step S32 (see FIG. 8) selected one assigned address from the terminal candidates and in step S33 (see FIG. 8) selected one assigned address from the terminal candidates with the assigned address selected in step S32 removed, but this is intended to be illustrative and not limiting. That is to say, it would be fine for the assistance device 20 for example to generate a number of assigned address sets corresponding to a number of wireless terminals designated by the user, by selecting a first predetermined number of assigned addresses in step S32, similarly selecting a second predetermined number of assigned addresses in step S33 and combining the assigned addresses selected in step S32 and the assigned addresses selected in step S33.

In addition, the above-described assistance device 20 had one modulation format designated by the user, but this is intended to be illustrative and not limiting, and it would be fine for there to be multiple modulation formats designated by the user. In this case, it would be fine for the assistance device 20 to generate communication setting information for each modulation format designated by the user.

In addition, the above-described assistance device 20 accomplished wireless communication with the wireless terminals 30, but this is intended to be illustrative and not limiting. That is to say, it would be fine for the assistance device 20 and the wireless terminals 30 to accomplish wired communication, and for wireless communication to be accomplished among the wireless terminals 30. In addition, when the wireless terminals 30 are substituted by communication terminals with communication lines, it would be fine for the assistance device 20 to accomplish wired communication with the substitute communication terminals. In addition, when the wireless terminals 30 are substituted by communication terminals with communication lines, it would be fine for each of the communication terminals to accomplish sending and receiving of test packets through wired communication.

In addition, the above-described assistance device 20 is such that in step S57 (see FIG. 10) sending commands for measurement data are sent to the wireless terminals 30 and the wireless terminals 30, upon receiving the sending commands, sent stored measurement data, but this is intended to be illustrative and not limiting. That is to say, it would be fine for the assistance device 20 to be such that in step S57 (see FIG. 10) a conclusion signal indicating conclusion of the test communication is sent to the wireless terminals 30 and the wireless terminals 30, upon receiving the conclusion signal, send the stored measurement data.

In addition, the above-described wireless terminals 30 recorded as measurement data information associating the assigned address indicating the destination of the test packets and the transmission time, and information associating the number of receptions of test packets and the reception times for each transmission source (sending terminal) of the test packets, but this is intended to be illustrative and not limiting. That is to say, it would be fine for the wireless terminals 30, besides the above-described information, to store information such as the transmission times of the test packets, the RSSI (Received Signal Strength Indicator), PER and throughput and/or the like of the test packets received and/or the like, for example. In addition, when the wireless terminals 30 are capable of sending an ACK (acknowledgement) signal, it would be fine for the wireless terminals 30 to store information indicating the reception time of the ACK signal, in addition to the above-described information. When test packets are received from other than a wireless terminal 30 indicated by a preset assigned address, it would be fine for the wireless terminals 30 to not include such in the number of receptions.

Furthermore, it would be fine for the wireless terminals 30 to add position information indicating position to the measurement data. When position information is added to the measurement data, it is possible for the assistance device 20 that received the measurement data to conduct analysis of the relationship between RSSI and distance between the wireless terminals 30, and/or the like. For the position information added to the measurement data, it would be fine to use information possessed by the wireless terminal 30 found through the TOA (Time Of Arrival) format, the TDOA (Time Difference Of Arrival) format, the RSSI format and/or the like.

It is possible for the test communication executed by the above-described wireless terminals 30 to use analysis of the breaking point of sending and receiving, analysis of the applicability of wireless communication under various environments, and/or the like.

In the above-described exemplary embodiment, it would be fine for the program for controlling the assistance device 20 and the wireless terminals 30 to be stored and distributed on a computer-readable non-transitory recording medium such as a flexible disk, CD-ROM (Compact Disc Read-Only Memory), DVD (Digital Versatile Disc), MO (Magneto-Optical Disc) and/or the like, and to compose the assistance device for executing the processes shown in FIGS. 6-10 and the wireless terminals for executing the processes shown in FIGS. 11-13 by installing the program on a computer and/or the like.

In addition, it would be fine to store the above-described program on a disk device and/or the like having a prescribed server device on a communication network such as the Internet and/or the like, and for example to download the program by overlaying the program on carrier waves.

In addition, when the processes shown in above-described FIGS. 6-10 and the processes shown in FIGS. 11-13 are realized by being divided by each OS (Operating System) or are realized through cooperation between OS and application, it would be fine to store and distribute only the portion other than the OS on a medium or to download such.

Having described and illustrated the principles of this application by reference to one exemplary embodiment, it should be apparent that the exemplary embodiment may be modified in arrangement and detail without departing from the principles disclosed herein and that it is intended that the application be construed as including all such modifications and variations insofar as they come within the spirit and scope of the subject matter disclosed herein.

The invention claimed is:

1. An assistance device, comprising:
a condition receiver for receiving test conditions that designate (i) a count of variations m for a communication path set that is a combination of communication paths in which a communication load test is performed, wherein m is a natural number, and (ii) a count of variations n for a volume of information communicated in the communication paths in the communication load test, wherein n is a natural number;
a designator for extracting a plurality of communication paths, each of the communication paths being a combination of a transmission-use communication device and a receiving-use communication device that differs from the transmission-use communication device, from a plurality of communication devices that are targets of the communication load test, and designating m communication path sets, each of the communication path sets being a combination of the extracted plurality of communication paths; and
a plan generator for generating an execution plan for executing m×n patterns of communication load tests, wherein the plan generator determines n volumes of information that the transmission-use communication device transmits and the receiving-use communication device receives in the communication load test, for each of the plurality of communication paths of the m communication path sets designated by the designator, and generates the m×n patterns of the communication load tests that are executed repeatedly, at predetermined intervals or randomly, in the communication paths,
wherein the designator designates the m communication path sets that are different from one another;
wherein the plan generator determines the n volumes of information that are different from one another, and generates the m×n patterns of communication load tests in which at least one of the communication path set and the volume of information of one pattern of the m×n patterns is different from the at least one of the communication path set and the volume of information of another pattern of the m×n patterns, and
wherein a total number of the receiving-use communication devices and the transmission-use communication devices is less than a total number of the communication devices that are the targets of the communication load test, the transmission-use communication devices and the receiving-use communication devices being extracted by the designator.

2. The assistance device according to claim 1, further comprising an executor for initiating the communication load tests according to the execution plan generated by the plan generator.

3. The assistance device according to claim 1,
wherein the designator, upon two identical communication paths existing among the extracted plurality of communication paths, changes the combination of the transmission-use communication device and the receiving-use communication device of one of the two identical communication paths to another combination that is different from the combination of the transmission-use communication device and the receiving-use communication device of the other one of the two identical communication paths.

4. The assistance device according to claim 1,
wherein the test conditions received by the condition receiver further comprise an input value for determination of applied values applied to respective parameters of the communication load tests; and
the plan generator generates the applied values based on the input value by the count of variations m or n, and generates the execution plan including the patterns of the communication load tests by applying the generated applied values to the parameters.

5. The assistance device according to claim 1,
wherein the assistance device further comprises a change receiver for receiving from a user input of a change in the execution plan generated by the plan generator;
wherein when the change is received by the change receiver, the plan generator generates again an execution plan by deleting from the generated execution plan a part of information corresponding to information indicating contents of the change received, and substituting the information indicating the contents of the change received in place of the deleted information.

6. The assistance device according to claim 1, further comprising a communicator for sending the execution plan generated by the plan generator to the communication devices.

7. The assistance device according to claim 1, further comprising an analyzer for receiving from the communication devices and analyzing information relating to results of transmitting the information and information relating to results of receiving the information, recorded in the communication devices.

8. A method that is executed by an assistance device, the method including:
   a condition receiving step in which the assistance device receives test conditions that designate (i) a count of variations m for a communication path set that is a combination of communication paths in which a communication load test is performed, wherein m is a natural number, and (ii) a count of variations n for a volume of information communicated in the communication paths in the communication load test, wherein n is a natural number;
   a designation step in which the assistance device extracts a plurality of communication paths, each of the communication paths being a combination of a transmission-use communication device and a receiving-use communication device that differs from the transmission-use communication device, from a plurality of communication devices that are targets of the communication load test, and designates m communication path sets, each of the communication path sets being a combination of the extracted plurality of communication paths; and
   a plan generation step in which the assistance device generates an execution plan for executing m×n patterns of communication load tests, wherein the assistance device determines n volumes of information that the transmission-use communication device transmits and the receiving-use communication device receives in the communication load test, for each of the plurality of communication paths of the m communication path sets designated in the designation step, and generates the m×n patterns of the communication load tests that are executed repeatedly, at predetermined intervals or randomly, in the communication paths,
   wherein the designation step includes designating the m communication path sets that are different from one another;
   wherein the plan generation step includes determining the n volumes of information that are different from one another, and generating the m×n patterns of communication load tests in which at least one of the communication path set and the volume of information of one pattern of the m×n patterns is different from the at least one of the communication path set and the volume of information of another pattern of the m×n patterns, and
   wherein a total number of the receiving-use communication devices and the transmission-use communication devices is less than a total number of the communication devices that are the targets of the communication load test, the transmission-use communication devices and the receiving-use communication devices being extracted in the designation step.

9. A computer-readable non-transitory recording medium having stored thereof a program executable by a computer, the program allowing the computer to realize:
   a condition receiving function for receiving test conditions that designate (i) a count of variations m for a communication path set that is a combination of communication paths in which a communication load test is performed, wherein m is natural number, and (ii) a count of variations n for a volume of information communicated in the communication paths in the communication load test, wherein n is a natural number;
   a designation function for extracting a plurality of communication paths, each of the communication paths being a combination of a transmission-use communication device and a receiving-use communication device that differs from the transmission-use communication device, from a plurality of communication devices that are a targets of the communication load test, and designating m communication path sets, each of the communication path sets being a combination of the extracted plurality of communication paths; and
   a plan generation function for generating an execution plan for executing m×n patterns of communication load tests, wherein the plan generation function determines n volumes of information that the transmission-use communication device transmits and the receiving-use communication device receives in the communication load test, for each of the plurality of communication paths of the m communication path sets designated by the designation function, and generates the m×n patterns of the communication load tests that are executed repeatedly, at predetermined intervals or randomly, in the communication paths,
   wherein the designation function designates the m communication path sets that are different from one another;
   wherein the plan generation function determines the n volumes of information that are different from one another, and generates the m×n patterns of communication load tests in which at least one of the communication path set and the volume of information of one pattern of the m×n patterns is different from the at least one of the communication path set and the volume of information of another pattern of the m×n patterns, and
   wherein a total number of the receiving-use communication devices and the transmission-use communication devices is less than a total number of the communication devices that are the targets of the communication load test, the transmission-use communication devices and the receiving-use communication devices being extracted by the designation function.

10. The assistance device according to claim 1, wherein the communication load tests are generated to test the traffic volume per the communication path that is the combination of the extracted transmission-use communication device and the extracted receiving-use communication device, and wherein the communication load tests use test packets.

11. The method according to claim 8, wherein the communication load tests are generated to test the traffic volume per the communication path that is the combination of the extracted transmission-use communication device and the extracted receiving-use communication device, and wherein the communication load tests use test packets.

12. The computer-readable non-transitory recording medium according to claim 9, wherein the communication load tests are generated to test the traffic volume per the communication path that is the combination of the extracted transmission-use communication device and the extracted receiving-use communication device, and wherein the communication load tests use test packets.

* * * * *